(12) United States Patent
Zimmerman, III

(10) Patent No.: US 12,380,462 B2
(45) Date of Patent: Aug. 5, 2025

(54) MUNICIPALITY-BASED DISTRIBUTED LEDGER ARCHITECTURE

(71) Applicant: NeXBIT Networks LLC, Wellington, FL (US)

(72) Inventor: Ronald B. Zimmerman, III, Wellington, FL (US)

(73) Assignee: NeXBIT Networks LLC, Wellington, FL (US)

(*) Notice: Subject to any disclaimer, the term of this patent is extended or adjusted under 35 U.S.C. 154(b) by 0 days.

(21) Appl. No.: 17/807,839

(22) Filed: Jun. 20, 2022

(65) Prior Publication Data

US 2022/0405791 A1 Dec. 22, 2022

Related U.S. Application Data

(60) Provisional application No. 63/213,102, filed on Jun. 21, 2021.

(51) Int. Cl.
*G06Q 30/00* (2023.01)
*G06Q 30/0207* (2023.01)
*G05B 19/418* (2006.01)

(52) U.S. Cl.
CPC ................ *G06Q 30/0207* (2013.01)

(58) Field of Classification Search
CPC .................................. G06Q 30/0207
See application file for complete search history.

(56) References Cited

U.S. PATENT DOCUMENTS

| | | | |
|---|---|---|---|
| 5,821,396 A * | 10/1998 | Bouziane | C10G 1/10 521/45.5 |
| 9,994,970 B2 | 6/2018 | Vince | |
| 10,556,211 B2 | 2/2020 | Kamali et al. | |
| 10,569,956 B1 | 2/2020 | Keshner et al. | |
| 10,662,550 B2 | 5/2020 | Zeng et al. | |
| 10,730,751 B2 | 8/2020 | Licht et al. | |
| 11,021,809 B2 | 6/2021 | Vince | |
| 2008/0248350 A1 | 10/2008 | Little et al. | |

(Continued)

OTHER PUBLICATIONS

• "Green Internet of Things (GIoT): Applications, Practices, Awareness, and Challenges". IEEE. 2021. (Year: 2021).*

(Continued)

*Primary Examiner* — Maria V Vanderhorst
(74) *Attorney, Agent, or Firm* — 24HourIP, PLLC

(57) ABSTRACT

A system includes a sensor at a first location proximate a polluting system to collect environmental data of a first type and an energy consumption monitoring platform at the first location to generate energy consumption data associated with the polluting system. The system includes a controller coupled to the sensor and the monitoring platform to direct communication of environmental data and energy consumption data to a remote computing server. A direct air capture (DAC) system at a second location removes a selected pollutant from ambient air and isolates a concentrated form of the pollutant as a raw material. A derivative product creation (DPC) system at a third location produces a derivative product from the raw material. The remote computing system accumulates pollutant credits based on removal of the selected pollutant by the DAC system and dissipates pollutant credits based on some of the energy consumption data.

20 Claims, 11 Drawing Sheets

(56) References Cited

U.S. PATENT DOCUMENTS

| | | |
|---|---|---|
| 2011/0226006 A1 | 9/2011 | Lackner et al. |
| 2014/0356267 A1 | 12/2014 | Hunwick |
| 2015/0165373 A1 | 6/2015 | Lackner |
| 2016/0045841 A1* | 2/2016 | Kaplan .................. C01B 32/05 |
| | | 429/49 |
| 2019/0271088 A1 | 9/2019 | Licht |
| 2020/0027096 A1* | 1/2020 | Cooner ................. G06Q 40/04 |
| 2020/0129916 A1 | 4/2020 | Constantz et al. |
| 2020/0309451 A1 | 10/2020 | Abarr |
| 2021/0285127 A1 | 9/2021 | Vince |
| 2021/0340680 A1 | 11/2021 | Licht |
| 2021/0387910 A1 | 12/2021 | Licht et al. |
| 2022/0156754 A1* | 5/2022 | MacArthur .......... G06Q 30/018 |

OTHER PUBLICATIONS

• "Wireless sensor network based pollution monitoring system in metropolitan cities". IEEE. 2015. (Year: 2015).*
"Blockchain for Waste Management in Smart Cities: A Survey". IEEE. 2021. (Year: 2021).*
U.S. Appl. No. 63/267,145, filed Jan. 26, 2022, Ronald B. Zimmerman III.

* cited by examiner

MUNICIPALITY-BASED DISTRIBUTED LEDGER ARCHITECTURE

CROSS-REFERENCE TO RELATED APPLICATIONS

This application claims the priority benefit of U.S. Provisional Patent Application No. 63/213,102, filed Jun. 21, 2022, which application is hereby incorporated by reference in its entirety.

BACKGROUND

Technical Field

The present disclosure generally relates to a distributed ledger architecture. More particularly, but not exclusively, the present disclosure relates to performing distributed ledger computing operations, a non-limiting example of which may be mining cryptocurrency, in a particular architecture permanently or semi-permanently located in a particular geographic region, said distributed ledger computing operations in some cases further applied to decentralized power operations, carbon sequestration, carbon credits, and lab-grown diamonds.

Description of the Related Art

Certain organizations attempt to reduce greenhouse gasses by providing a marketplace for energy credits, which may otherwise be referred to as pollution credits, carbon credits, or some other like term. Voluntary and required participation in a system of carbon credits incentivizes pollutant producers to reduce carbon output and incentivizes carbon collectors to more efficiently capture pollutants.

Distributed ledger computing is known. Distributed ledger computing is useful, for example, to record, share, and synchronize data in a highly secure electronic manner. More specifically, distributed ledger computing is useful, for example, to record transactions related to certain assets. In such case, transactions and other details are concurrently or simultaneously recorded on two or more computing servers wherein the group of two or more computing servers act as a non-centralized database having no single administration facility. Instead, the database exists as a database distributed among several computing servers and/or several different geographical locations.

In one definition, distributed ledger computing refers to the computing infrastructure and protocols that permit concurrent or even simultaneous access, validation, and recordation in an immutable way across a communications network that includes two or more computing servers in the same or different locations.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The device, method, and system embodiments described in this disclosure (i.e., the teachings of this disclosure) enable an ecosystem that addresses particular environmental concerns related to pollution producers, pollution collectors, and a system to efficiently manage energy credits associated with one or more pollutants. A municipality, a business, or some other organization can accurately track energy usage, pollutant creation, and pollutant sequestration in a way that holds all parties accountable for contributing to the cause, remediation, or cause and remediation of certain activities attributed to global climate change.

The device, method, and system embodiments described in this disclosure (i.e., the teachings of this disclosure) may also include processing a captured pollutant such as carbon dioxide into a raw material such as concentrated carbon nanofibers, and processing the raw material into a derivative product such as a synthetic diamond material.

The device, method, and system embodiments described in this disclosure (i.e., the teachings of this disclosure) may also facilitate improvements related to distributed ledger operations. A system, for example, may include a centralized computing platform (CCP) and a plurality of municipality-based mining devices. In some cases, one or more of the mining devices is arranged as an energy consumption monitoring platform that accurately tracks and reports energy consumption of a particular device, system, machine, building, campus, industrial operation, or the like. Embodiments of the CCP are arranged to communicate with a distributed ledger source and further arranged to validate distributed ledger transactions in exchange for remuneration. The plurality of municipality-based mining devices may be physically located on, within, or proximate to infrastructure of a certain municipality, and each of the plurality of municipality-based mining devices may be arranged to receive utility grid power on behalf of the certain municipality. In some cases, each of the plurality of municipality-based mining devices may be further arranged for high-speed communications to the CCP. The plurality of municipality-based mining devices sometimes includes cooperation logic arranged to prevent duplication of work of others of the plurality of municipality-based mining devices. Optionally, the CCP includes second cooperation logic arranged to direct the cooperation logic of each of the plurality of municipality-based mining devices.

In a first embodiment, a system, includes a sensor deployed at a first location proximate a polluting system, the sensor arranged to collect environmental data of a first type; an energy consumption monitoring platform deployed at the first location, the energy consumption monitoring platform arranged to generate energy consumption data associated with the polluting system; a controller communicatively coupled to the sensor and the energy consumption monitoring platform, the controller arranged to direct communication of at least some of the environmental data and at least some of the energy consumption data to a remote computing server; a direct air capture (DAC) system deployed at a second location, the DAC system arranged to remove a selected pollutant from ambient air and isolate a concentrated form of said pollutant as a raw material; and a derivative product creation (DPC) system deployed at a third location, the DPC system arranged to produce a derivative product by processing the raw material. The remote computing system is deployed at a fourth location. The remote computing system is arranged to: accumulate pollutant credits based on removal of the selected pollutant by the DAC system; and dissipate pollutant credits based on at least some of the energy consumption data.

In some cases of the first embodiment, the polluting system is an energy production facility, a roadway materials production facility, an industrial manufacturing facility, or at least one piece of heating, ventilation, or air conditioning (HVAC) equipment. In some cases, at least two of the first location, the second location, the third location, and the fourth location are in about the same geographic area. And in some cases, the sensor is arranged to collect environmental data representing a quantity of at least one of: carbon dioxide, sodium dioxide, nitrous oxide, benzene, methane, a chlorofluorocarbon.

In these or other cases of the first embodiment, the selected pollutant is a gas that absorbs and emits radiant energy within the thermal infrared range, and in some cases, the energy consumption data is at least one of current and power. Sometimes, the raw material is a liquified carbon dioxide solution, and in these cases, the derivative product is sometimes a synthetic diamond material.

In some cases of the first embodiment, the system further includes a plurality of sensors deployed at a respective plurality of disparate locations, each of the plurality of sensors deployed proximate a respective polluting system, each of the plurality of sensors arranged to collect environmental data of the first type.

In still other cases of the first embodiment, the system further includes a plurality of municipality-based mining devices physically located on, within, or proximate to infrastructure of a certain municipality, each of the plurality of municipality-based mining devices arranged to receive utility grid power on behalf of the certain municipality and further arranged for high-speed communications to the remote computing system, wherein each of the plurality of municipality-based mining devices is formed in a respective energy consumption monitoring platform that includes cooperation logic arranged to prevent duplication of work of others of the plurality of municipality-based mining devices, wherein the remote computing system is further arranged to: communicate with a distributed ledger source; and validate distributed ledger transactions in exchange for remuneration. Sometimes, the remote computing system includes second cooperation logic arranged to direct the cooperation logic of each of the plurality of municipality-based mining devices.

In a second embodiment, a method, includes deploying a sensor at a first location proximate a polluting system; collecting, with the sensor, environmental data of a first type; deploying an energy consumption monitoring platform at the first location; generating, with the energy consumption monitoring platform, energy consumption data associated with the polluting system; directing, with a controller that is communicatively coupled to the sensor and the energy consumption monitoring platform, communication of at least some of the environmental data and at least some of the energy consumption data to a remote computing server; deploying a direct air capture (DAC) system at a second location; removing, with the DAC system, a selected pollutant from ambient air; isolating, with the DAC system, a concentrated form of said pollutant as a raw material; deploying a derivative product creation (DPC) system at a third location; and processing the raw material with the DPC system into a derivative product.

In some cases of the second embodiment, the method further includes deploying the remote computing system at a fourth location; accumulating, with the remote computing system, pollutant credits based on removal of the selected pollutant by the DAC system; and dissipating, with the remote computing system, pollutant credits based on at least some of the energy consumption data. Sometimes, the selected pollutant is carbon dioxide, and sometimes the derivative product is a synthetic diamond material.

In a third embodiment, a non-transitory computer-readable storage medium has stored contents that configure a computing system to perform a method. The method includes: accumulating, with the computing system, pollutant credits based on removal of a selected pollutant by a direct air capture (DAC) system; and dissipating, with the computing system, pollutant credits based on at least some of energy consumption data associated with a pollutant producer. The dissipating is based on environmental data generated by a sensor deployed at a first location and energy consumption data is generated by an energy consumption monitoring platform deployed at the first location, and the accumulating is based on removing, with a direct air capture (DAC) system deployed at a second location, at least some of the selected pollutant from ambient air.

In some cases of the third embodiment, the DAC system is arranged to produce a concentrated form of said pollutant as a raw material, and wherein the raw material is arranged to be processed into a derivative product with a derivative product creation (DPC) system deployed at a third location. Sometimes, at least two of the first location, the second location, and the third location are in about the same geographic area. And sometimes, the derivative product is a synthetic diamond material.

Within the devices, systems, and methods discussed in the present disclosure, distributed ledger, pollutant sequestration, and synthetic material formation operations are performed efficiently, with reduced power costs, and in some cases proximate to where the results of such operations are verified or otherwise implemented. The innovation described in the present disclosure is new and useful, and the innovation is not well-known, routine, or conventional in the distributed ledger, pollutant sequestration, and synthetic material formation industries.

The innovation described herein uses known building blocks combined in new and useful ways along with other structures and limitations to create something more than has heretofore been conventionally known. The embodiments improve on computing systems which, when un-programmed or differently programmed, cannot perform or provide the specific distributed ledger and other control operations claimed herein.

The embodiments described in the present disclosure improve upon known distributed ledger, pollutant sequestration, and synthetic material formation processes and techniques.

The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately.

There is no prevailing, accepted definition for what constitutes an abstract idea. To the extent the concepts discussed in the present disclosure may be considered abstract, the claims present tangible, practical, and concrete applications of said allegedly abstract concepts.

The embodiments described herein use computerized technology to improve the technology of distributed ledger operations, pollutant sequestration, and synthetic material formation, but there other techniques and tools remain available to perform distributed ledger, pollutant sequestration, and synthetic material formation operations. Therefore, the claimed subject matter does not foreclose the whole or even substantial distributed ledger, pollutant sequestration, and synthetic material formation technological areas.

These features with other objects and advantages that will become subsequently apparent reside in the details of construction and operation as more fully described hereafter and claimed, reference being had to the accompanying drawings forming a part hereof.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

Figure 1:
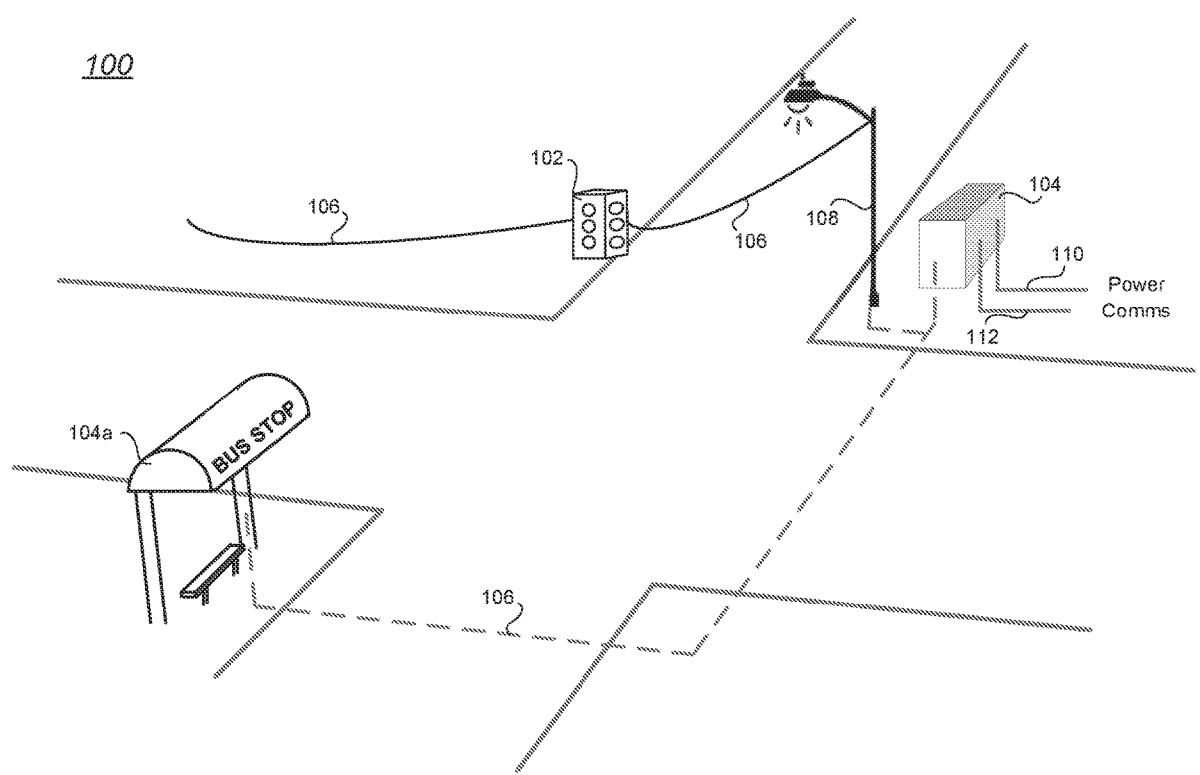
FIG. 1 is a system level deployment of a municipality-based distributed ledger architecture.

In the present disclosure, for brevity, certain sets of related figures may be referred to as a single, multi-part figure to facilitate a clearer understanding of the illustrated subject matter. For example, FIGS. 6A-6E may be individually or collectively referred to as FIG. 6. Structures earlier identified may not be repeated for brevity.

DETAILED DESCRIPTION

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined in the present disclosure, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring more detailed descriptions of the embodiments.

The device, method, and system embodiments described in this disclosure (i.e., the teachings of this disclosure) enable a municipality, a business, or some other organization to accurately track energy usage, pollutant creation, and pollutant sequestration in a way that holds all parties accountable for contributing to the cause, remediation, or cause and remediation of certain activities attributed to global climate change. In some cases, the teachings of this disclosure include accurate measurement and reporting of energy consumption by a particular device, system, machine, building, campus, industrial operation, or the like in a first geographic location; accurate measurement and reporting of pollutants introduced or otherwise present in the first geographic area; accurate measurement and reporting of pollutant capture in a second geographic area, which may be the same or different from the first geographic area; and accurate accumulation and dissipation of pollutant credits based at least some of the energy consumption data, pollutant production data, and/or pollutant capture data.

The device, method, and system embodiments described in this disclosure (i.e., the teachings of this disclosure) may also include processing a captured pollutant such as carbon dioxide into a raw material such as concentrated carbon nanofibers, and processing the raw material into a derivative product such as a synthetic diamond material.

The device, method, and system embodiments described in this disclosure (i.e., the teachings of this disclosure) may also enable a municipality to put under-utilized physical space, power, and communications infrastructure to a productive use that benefits the citizens of the municipality while concurrently performing useful service in commerce. In at least some embodiments described in the present disclosure, the under-utilized physical space is used as a location to house, mount, enclose, or otherwise support one or more specialized computing devices arranged to perform distributed ledger computing operations. Each specialized computing device is electrically coupled to the under-utilized power, and each specialized computing device is communicatively coupled to the under-utilized communications infrastructure. In one exemplary case, portions of the present disclosure illustrate and describe a decentralized municipality-based multipooled cryptocurrency mining system having particular advantages over other cryptocurrency mining systems. In other cases, in addition or as an alternative to mining cryptocurrency, the teaching of the present disclosure may be applied to perform computations associated with blockchain validation, smart contracts, secure voting, banking transactions, copyright management, digital identification, management of private healthcare data, and many other things.

Complimentary to the teaching of the present disclosure, the present inventor has recognized that a real problem exists for the improved acceleration of cryptocurrency mining due, at least in part and in some cases, to the price and resources needed to mine each block. That is, the success of mining each block can sometimes be tied to electricity consumption and available processing power. The present inventor has further recognized that many municipalities are operating on reduced budgets and have existing infrastructure that has been a common loss leader and cost center. One way to address these problems is to improve decentralization by utilizing the existing infrastructure of common municipality-owned assets that are connected to the power grid and to high-speed communication sources. Such decentralization would allow, for example, multipooled miners, double geometric method miners, and/or other such structures to be stood up using the municipalities' existing and available infrastructure.

Multipools are known to switch between different altcoins while quickly and frequently, or constantly, determining which coin is most profitable to mine at or near that moment. Two factors are often involved in the algorithms that calculate profitability: 1) the block time, and 2) the price of a coin being mined on one or more digital currency exchanges. To reduce or avoid the need for many different electronic wallets, each arranged for one or more of the possible mineable coins, multipools may automatically exchange the mined coin for a full or portion of a coin that is more accepted in the mainstream such as BITCOIN, ETHEREUM, or the like. One benefit of using this method is that it is possible to receive more coins in the intended currency than it would be if the intended currency was directly mined. In some cases, this benefit is realized because more profitable coins are being mined and then sold or otherwise exchanged for the intended coin. Related, applying the teaching of the present disclosure may also increase demand on the intended coin, which may increase, stabilize, or increase and stabilize the value of the intended coin.

At least one determination of successful mining is based on how profitable any one particular mining device, or group of mining devices, is. In such cases, the profitability may be correlated to the hash rate of the particular mining device or group of devices. Older mining devices could achieve hash rates in the tens or hundreds of megahashes per second (MH/s); conventional mining devices may achieve hash rates in the tens or hundreds of gigahashes per second (GH/s), and advanced and future mining devices may achieve hash rates in the tens or hundreds of terahashes per second (TH/s) or even more.

In at least one embodiment, desirable mining devices are physically located and electrically coupled to existing municipal infrastructures and also communicatively coupled to a centralized computing platform. The centralized computing platform operates on behalf of a certain authority, such as the municipality where the desirable mining devices are located, or an entity contracted by the municipality. The desirable mining devices are directed by the centralized computing platform to act as a cooperative group (e.g., a pool) of block miners that utilize their combined resources to generate blocks more quickly and therefore receive a portion of block rewards on a more frequent, consistent, or otherwise improved basis, rather than occasionally, randomly, or otherwise infrequently (e.g., once every few years).

People in many zones, provinces, sectors, regions, territories, towns, cities, counties, states, countries, and other geographic areas accept that certain pollutants in the atmosphere contribute to a phenomenon known as global climate change (GCC). These people also accept that a reduction of these pollutants in the atmosphere will help alleviate various negative effects of GCC. Along these lines, these and other people, politicians in particular, support certain initiatives aimed at reducing the incidence of at least some pollutants in the atmosphere.

In the present disclosure, a pollutant is an airborne substance that causes, or is believed to cause, at least one negative effect. Greenhouse gasses, for example, are considered a pollutant in the present disclosure. A greenhouse gas, or "GHG," is a gas that absorbs infrared radiation (i.e., net heat energy) emanating from Earth's surface and re-radiates at least some of that radiation back to Earth's surface, thus contributing to Earth's atmospheric greenhouse effect. Stated another way, a greenhouse gas pollutant is a gas that absorbs and emits radiant energy within the thermal infrared range. Carbon dioxide, methane, and water vapor are common greenhouse gasses. Surface-level ozone, nitrous oxides, chlorofluorocarbons, and other fluorinated gasses (i.e., F-gasses), which also trap infrared radiation, are greenhouse gasses. A non-exhaustive, non-limiting list of additional substances that are considered pollutants in the present disclosure includes benzene, lead, carbon monoxide, various nitrogen oxides, various sulfur oxides, total reduced sulfur, volatile organic compounds (VOC), non-naturally occurring particulate matter, and the like.

The present inventor has recognized that new, enabling technologies created by the inventor to facilitate the distributed ledger technologies described herein can also be used with other developing technologies to reduce the incidence of certain pollutants in the atmosphere. Systems that combine these new, enabling technologies with the developing technologies can provide many benefits including, for example, holding polluters accountable for creation of the pollution, reducing the amount of pollution in the atmosphere while concurrently creating useful raw material, and using the created raw material to produce a useful derivative product.

In a first pollutant-remediation embodiment, a system includes at least one sensor and at least one energy consumption monitoring platform. One or more of the sensors is/are located proximate one or more of the energy consumption monitoring platforms. In this way, energy consumption data may be correlated with pollutant data. If, for example, a concrete production plant, which is an operation having a large carbon footprint, accurately measures its energy consumption, then the energy consumption can be correlated with elevated levels of carbon dioxide measured by one or more sensors around the concrete plant. The sensor or sensors, and the one or more energy consumption monitoring platforms can optionally measure or otherwise determine baseline data during times of non-concrete production or in corresponding geographic areas of non-concrete production to even more accurately form the correlation. In some cases, government entities assess certain taxes, fines, or other accountability measures commensurate with the amount of pollutant produced by entity (e.g., the concrete production plant).

In the present disclosure, locating a sensor and an energy consumption monitoring platform proximate to each other means that the two devices may be within inches, feet, yards, or even miles of each other. That is, proximately locating a sensor and an energy consumption monitoring platform means that the two devices are located in the same building or housing, attached to the same building or housing, located at the same campus, located within a same acre, or located within some other proximity. Two devices are located proximate each other when it can be determined with acceptable accuracy that the presence of a certain pollutant or the presence of a certain amount of pollutant in the atmosphere can be correlated with an amount of energy consumed in the exact same, or about the same, area. In at least one embodiment, a sensor is proximate an energy consumption monitoring platform when the sensor is able to generate data associated with a certain pollutant and correlate this sensor data with energy usage data generated by an associated energy consumption monitoring platform. Such correlation may be over a certain period of time (e.g., seconds, minutes, hours, or the like), over a certain number of samples (e.g., five, ten, fifty, hundreds, thousands, or more), or by some other algorithmic measure. When such a correlation can be made, the proximate relationship may be referred to as both the sensor and the energy consumption monitoring platform being located in a certain geographic area.

In at least some cases, one or both of a sensor and an energy consumption monitoring platform optionally calibrate a "normal" data reading with an "abnormal" reading. Such calibration may be performed by comparing actual measurements to one or more of: a) known normal data; b) data measured, calculated, or otherwise derived at a non-polluting time; c) data generated by a non-pollution area; d) data generated by a non-polluting system; or e) baseline data generated by some other means.

Still considering the first pollutant-remediation embodiment, one or more of the sensors are deployed at a first location proximate a polluting system, and at least one energy consumption monitoring platform is also deployed at the first location. The polluting system may be an energy production facility such as an electricity generating plant, a fossil fuel collection/distribution site (e.g., drilling, refining, transportation), a roadway materials production facility (e.g., concrete, cement, asphalt, or the like), an industrial manufacturing facility, or at least one piece of heating, ventilation, or air conditioning (HVAC) equipment. Other polluting systems are of course contemplated.

The sensor or sensors may be arranged to collect environmental data of a first type. The first type may be a greenhouse gas or any other pollutant. In some cases, a first sensor is arranged to collect environmental data of a first type, a second sensor is arranged to collect environmental data of a second type, and an Nth sensor is arranged to collect environmental data of an Nth type. Multiple sensors may collect environmental data of the same type in some cases, or multiple sensors may each collect environmental data of different types in some cases. In at least one case, sensors are arranged to collect environmental data representing a quantity of carbon dioxide, sodium dioxide, nitrous oxide, benzene, methane, a chlorofluorocarbon, or some other pollutant.

The one or more energy consumption monitoring platforms of the first pollutant-remediation embodiment are arranged to generate energy consumption data associated with the polluting system. The energy consumption data may be current, power, or some other energy data. In some cases, an energy consumption monitoring platform is arranged to enable an authorization circuit having at least one authorization mechanism to cooperate with an access circuit having at least one key mechanism. Upon successfully authorizing at least one datum communicated from the key mechanism of the access circuit, the authorization circuit is arranged to deliver power having determined characteristics to the access circuit. The authorization circuit may be arranged as a circuit wired or wirelessly coupled to a power infrastructure in a building, a power grid, a mains power, or some other power source. In some cases, the access circuit is arranged as a smart power plug circuit.

Considering further the first pollutant-remediation embodiment, a controller is in some cases communicatively coupled to one or more of the sensors and any suitable number of energy consumption monitoring platforms. The controller, which typically includes a processor, a transceiver, and memory programmed to direct operations of the processor and transceiver. The directed operations can include one or more acts to direct communication of at least some of the environmental data formed by one or more sensors and/or at least some of the energy consumption data formed by at least one energy consumption monitoring platform to a remote computing server.

The system of the first pollutant-remediation embodiment may optionally include other modules, devices, sub-systems, or the like. For example, in some cases, a direct air capture (DAC) system deployed at a second location. The second location may be in a about same geographic area as the first location, or the second location may be a different geographic area from the first location. In at least some cases, the second location is an area of generally high velocity winds, which can indicate an area where a substantial volume of ambient air from other geographic areas passes through. Since a DAC system is arranged to remove a selected pollutant from ambient air, it is often beneficial to locate the DAC system where a lot of potentially polluted air will pass.

In some cases, the DAC system is arranged to sequester any number of pollutants, which may include the subject pollutant. Sequestration may include forcing (e.g., pumping, driving, injecting, releasing, or the like) the pollutant into one or more naturally occurring or artificially created repositories in Earth. Alternatively, sequestration may include forcing the pollutant into a manmade container for transport, storage, or other purposes. In some cases, for example, the DAC system includes processing machinery to isolate a subject pollutant for later use as a raw material for another process. The subject pollutant may be a concentrated form of the subject pollutant. In at least some cases, the subject pollutant may be carbon dioxide and the DAC system is further arranged to produce a carbonate electrolyte including transition metal powder from which macro length carbon nanotubes are formed as a raw material for use in a derivative product creation (DPC) system. Hence, in at least this one embodiment, the carbonate electrolyte having the transition metal powder is provided between a nickel alloy anode and a nickel alloy cathode. The carbonate electrolyte is heated to a molten state, an electrical current is applied to the nickel alloy anode, the nickel alloy cathode, and the molten carbonate electrolyte disposed between the anode and cathode to induce carbon nanotube growth, which is collected from the cathode of the cell. In other cases, using other known means, the DAC may be arranged to produce a liquified carbon dioxide solution.

Another optional component included in at least some cases of the first pollutant-remediation embodiment is a derivative product creation (DPC) system deployed at a third location. The third location may be in about a same geographic area as the first location, the second location, or the first and second location. Alternatively, the third location may be a different geographic area from one or both of the first location and the second location. The DPC system, if included in the first pollutant-remediation embodiment, is arranged to produce a derivative product by processing the raw material. In at least one case, the derivative product is a synthetic diamond material. Along these lines, the DPC system may, for example: a) intake a macro length carbon nanotube raw material or liquified carbon dioxide solution produced by a DAC system; b) conduct electrolysis of water to provide hydrogen; c) react the carbon raw material with the hydrogen to produce methane; and d) use the hydrogen and the methane to produce a synthetic diamond via a chemical vapor deposition (CVD) process.

Finally, the first pollutant-remediation embodiment may include or otherwise interact with a remote computing system. The remote computing system may be deployed at a fourth location. The fourth location may be in about a same geographic area as any one or more of the first location, the second location, and the third location. Alternatively, the third location may be a different geographic area from any one or more of the first location, the second location, and the third location. The remote computing system is arranged to: accumulate pollutant credits based on removal of the selected pollutant by the DAC system; and dissipate pollutant credits based on at least some of the energy consumption data.

In a second pollutant-remediation embodiment, a system includes some or all of the features of the first pollutant-remediation embodiment and at least one additional feature. In some cases, the additional feature is a plurality of sensors deployed at a respective plurality of disparate locations. In such cases, each of the plurality of sensors is deployed proximate a respective polluting system, and each of the plurality of sensors arranged to collect environmental data of a same type. In other cases, the additional feature is a second sensor deployed at a fifth location proximate a second polluting system. In such cases, the second sensor may be arranged to collect environmental data of a second type, and the second type may be the same or different from the first type of data collected by other sensors of the system.

FIG. 1 is a system level deployment 100 of a municipality-based distributed ledger architecture. A traffic control signal 102 is electrically coupled to a utility vault 104. The electrical coupling 106 may include any one or more of a power conduit, a control signal medium, a data communication medium, and the like. A support structure 108 may be a utility pole, light tower, or any other suitable above-ground or below-ground structure that assists in the electrical coupling 106 of the traffic control signal 102 to the utility vault 104. The utility vault 104 includes a power interface 110 and a high-speed communications interface 112.

The power interface 110 may include any suitable coupling to utility grid power. The utility grid power may be a powerline source providing 120 volt, alternating current (VAC), 208 VAC, 220 VAC, 240 VAC, 260 VAC, 277 VAC, 360 VAC, 415 VAC, 480 VAC, 600 VAC, or some other power source voltage. The high-speed communications interface 112 may include any suitable means for passing at least one million bits per second. In various embodiments, the high-speed communications interface 112 is arranged for uni-directional or bi-directional data rates of 100 megabits-per-second (100 Mbps), 500 Mbps, one gigabit-per-second (1 Gbps), 2 Gbps, 10 Gbps, or some greater data rate. The high-speed communications interface 112 may include communications conduit formed, at least in part, with copper wire, fiber optic cable (e.g., single strand optical fiber, multi-strand optical fiber, or the like), industrial Ethernet cable, and the like. In some cases, the high-speed communications interface 112 includes wireless communications infrastructure (e.g., radio frequency (RF) based communications, laser-based communications, microwave communications, and the like).

The system level deployment 100 illustrates a roadway intersection with a utility vault 104, however, one of skill in the art will recognize that any other infrastructure of the municipality is also contemplated. For example, a bus stop 104a may also be electrically coupled 106 to the utility vault 104. Non-limiting examples of other smart city infrastructure that are contemplated but not illustrated include pedestrian control devices (e.g., walk/don't-walk signs, lighted signs, and the like), industrial infrastructure (e.g., heating, ventilation, air conditioning (HVAC) equipment, air quality units, elevator/escalator units, public water facilities, public sewer facilities, trash and recycling facilities, public accommodations (e.g., restrooms, food preparation facilities, food service facilities, vending equipment, fueling stations, and the like), antennas, public safety structures (e.g., police departments, police kiosks, fire departments, and the like), and any other suitable environments where power and high-speed communications are situated.

Figure 2:
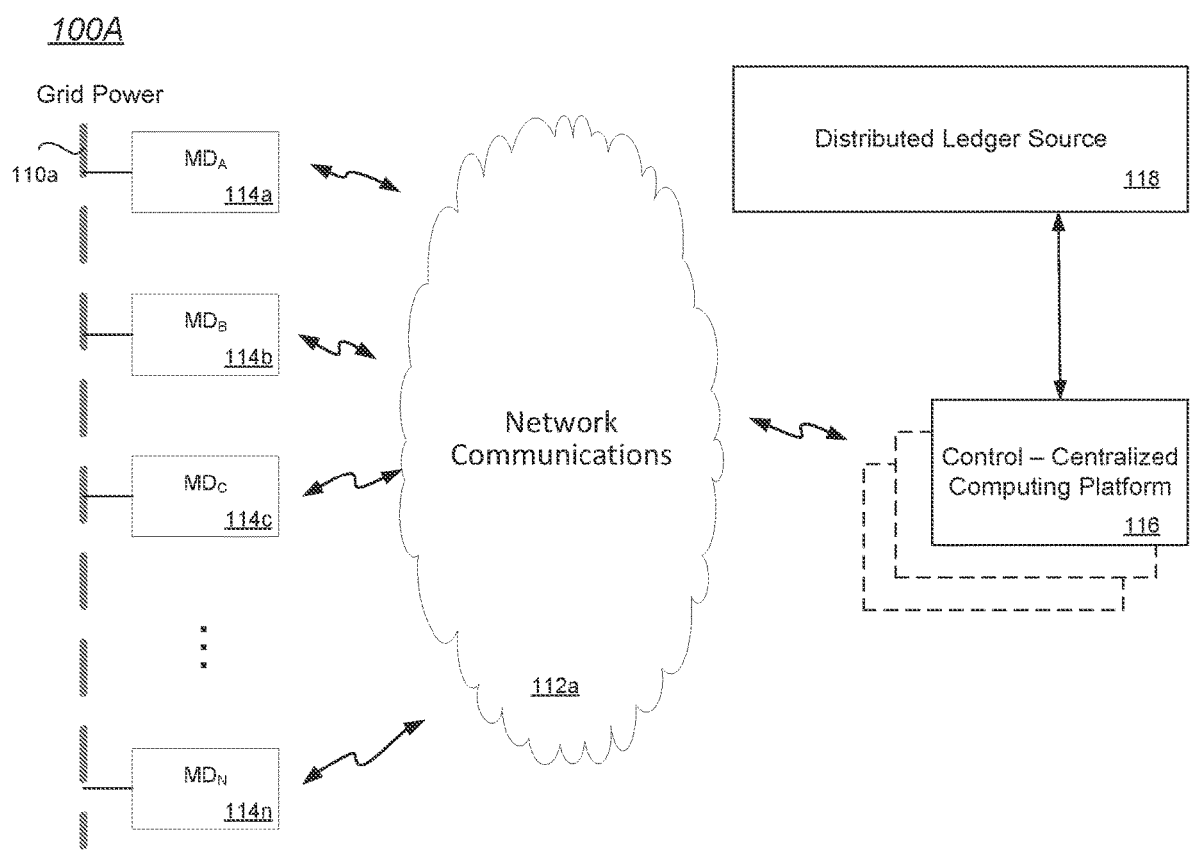
FIG. 2 is a system level schematic of the exemplary municipality-based distributed ledger architecture of FIG. 1.

FIG. 2 is a system level schematic 100A of the exemplary municipality-based distributed ledger architecture of FIG. 1. A power interface 110a, such as utility grid power, is electrically coupled to a plurality of municipality-based mining devices 114a, 114b, 114c, 114n. Each of the municipality-based mining devices 114a-114n is communicatively coupled via a high-speed communications network 112a. The high-speed communications network 112a is formed by any suitable components, circuits, devices, and the like that facilitate communications along the lines of the high-speed communications interface 112 of FIG. 1. Along these lines, the high-speed communications interface 112 may be arranged as any one or more of a wide area network such as the internet, a cellular based communication system, or some other high-speed communications interface.

The municipality-based mining devices 114a-114n receive direction and report results to a centralized computing platform 116. The centralized computing platform 116 may be arranged as a single computing server or a plurality of computing servers. The centralized computing platform 116 may be directed by a municipality, an entity working on behalf of the municipality, or via some other controlling authority. The centralized computing platform 116 may have resources inside the physical geographic boundaries of the subject municipality, outside the physical geographic boundaries of the subject municipality, or distributed both inside and outside the physical geographic boundaries of the subject municipality.

The centralized computing platform 116 operates in conjunction with a distributed ledger source 118. The distributed ledger source 118 may be a cryptocurrency exchange (e.g., COINBASE, BINANCE, FTX.US, CRYPTO.COM, or the like). Additionally, or alternatively, the distributed ledger source 118 may be a smart contracts administrator, a secure voting entity, a banking institution, or any other body or thing that requires validation of blockchain or blockchain-like transactions. The centralized computing platform 116 communicates with the distributed ledger source 118 and determines how to deploy the municipality-based mining device 114a-114n resources. For example, in at least one embodiment, the centralized computing platform 116 will direct certain ones of the municipality-based mining devices 114a-114n to perform certain hash functions in order to mine certain cryptocurrency.

Figure 3:
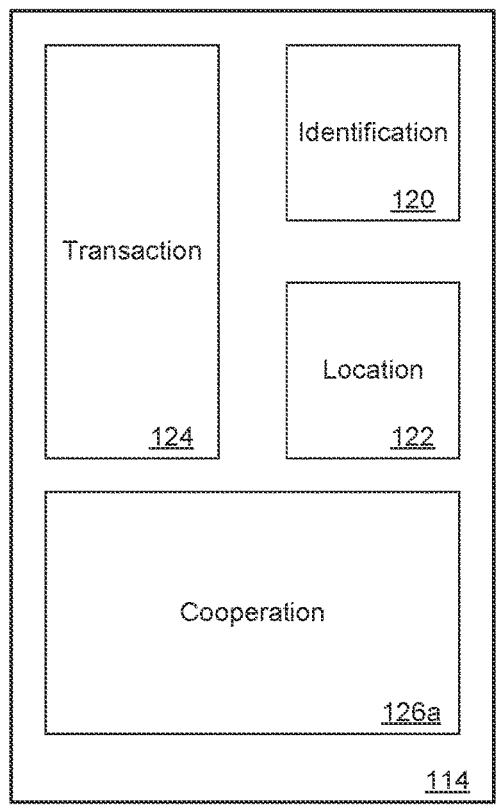
FIG. 3 is an exemplary municipality-based mining device.

FIG. 3 is an exemplary municipality-based mining device 114. The exemplary municipality-based mining device 114 may include an optional identification module 120, an optional location module 122, and transaction logic 124. The municipality-based mining device 114 also includes a cooperation module 126a.

In some cases, the optional identification module 120 is arranged as a system-wide unique value. In some cases, the optional identification module 120 is arranged as an electronic-, software-, or electronic- and software-based trust zone. Other means of identifying each specific municipality-based mining device 114 are also contemplated.

The location module 122 may include a permanently or semi-permanently encoded value representing a unique physical location. The unique physical location may be a street address, a location inside a utility vault or other municipal infrastructure, a latitude/longitude identifier, a set of global positioning system (GPS) coordinates, an encoded value, or the like. In some cases, the location module includes electronic circuitry that receives and processes information from one or more satellites to determine a precise physical location (e.g., a global position system (GPS) receiver, a BeiDou navigation system (BDS) receiver, a Globalnaya Navigazionnaya Sputnikovaya Sistema (GLONASS) receiver, or the like).

The transaction logic 124 includes any suitable hardware in any suitable configuration arranged to perform complex computations, such as hash algorithms, in a known way. In some cases, the transaction logic 124 is arranged from one or more graphics processor modules, one or more application specific integrated circuits (ASICs), or other known circuitry. Details of the transaction logic are known, and not illustrated to avoid unnecessarily complicating the present disclosure.

Figure 4:
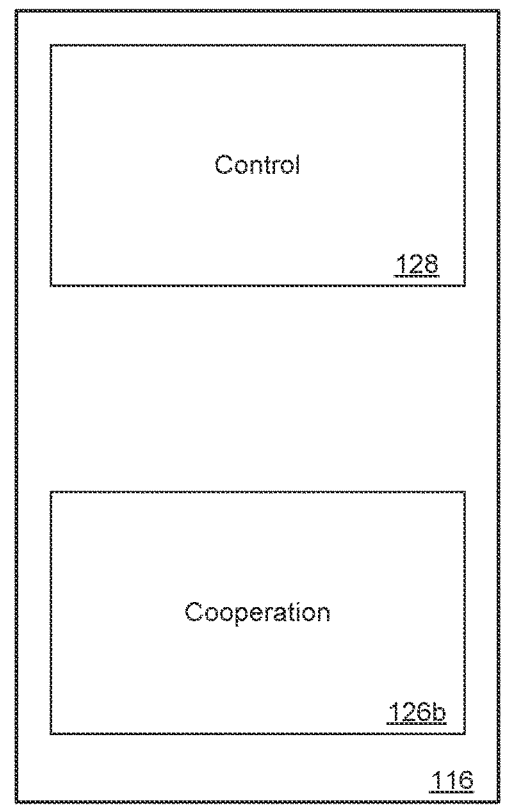
FIG. 4 is an exemplary centralized computing platform.

FIG. 4 is an exemplary centralized computing platform 116. The exemplary centralized computing platform 116 includes a cooperation module 126b and control logic 128. The control logic 128 includes circuitry, software, or circuitry and software of a computing server. The control logic 128 performs and oversees operations of the centralized computing platform 116 such as communications with a distributed ledger source 118, communications with municipality-based mining devices 114a-114n, and the like.

The cooperation module 126a of a municipality-based mining device 114 works cooperatively with the cooperation module 126b of the centralized computing platform 116. In some cases, one cooperation module 126a of one of the municipality-based mining devices 114a-114n (FIG. 2) cooperates with the cooperation module 126a of another one of the municipality-based mining devices 114a-114n. In some cases, the cooperation module 126b of the centralized computing platform 116 of one municipality cooperates with the cooperation module 126b of the centralized computing platform 116 of another municipality. Such cooperation is facilitated by the high-speed communications interface 112 (FIG. 1) and/or the high-speed communications network 112a (FIG. 2).

In this present disclosure, cooperation between modules may include a master slave relationship, a polling relationship, a test and listen architecture, a time-sliced communication scheme, or any other cooperation mechanism. Such modules may communicate peer-to-peer or one-to-many. In some cases, the cooperation includes cooperation module 126b providing direction to one or more cooperation modules 126a regarding performance of algorithms, performance of hash functions, shared computing, and the like. In some cases, when a particular blockchain algorithm is to be performed, each of any suitable number of cooperation modules 126a may receive a different starting seed value from cooperation module 126b.

Generally, each municipality-based mining device 114 is arranged to perform transactions (e.g., validation of blocks in a proof-of-work blockchain) via a "challenge" for the mining device, and the challenge is to be the first device to successfully solve a given math problem. Successfully solving the math problem requires, in at least some cases, a determination of a value that meets particular mathematical requirements related to a target hash value. The target hash value is provided by the distributed ledger source 118, either directly or via the centralized computing platform 116, and the municipality-based mining device 114 solves the math problem/challenge by repeatedly guessing and then checking whether the computed value, when hashed, will provide a winning solution (i.e., a solution that meets particular mathematical requirements related to the target hash value). In such cases, a winning solution is a "nonce' (i.e., a number or value used once) that, on average, proves the municipality-based mining device 114 performed the work to solve the math problem. Other devices, including those operating on behalf of the distributed ledger source 118, can easily verify the solution.

In order to arrive at any given nonce, the transaction logic 124 of the municipality-based mining device 114 starts its algorithm with a particular seed value. The algorithm is executed (i.e., a guess is generated), and the nonce is tested (i.e., the solution/nonce is checked). If the requirements are met, the nonce is returned to the distribution ledger source for verification and possible remuneration. If the requirements are not met, the nonce is set aside and a new seed value is used to re-run the algorithm. In some cases, a previously calculated nonce is used in part or in total to form the next seed value. In other cases, the next seed value is determined in a new way. The cooperation module 126a works to prevent one of the municipality-based mining devices 114a-114n from duplicating the work of any other one of the municipality-based mining devices 114a-114n.

In some cases, work duplication is prevented by facilitating the high-speed communications resources (e.g., high-speed communications interface 112, high-speed communications network 112a, or other high-speed communications conduit) to verify that each municipality-based mining device 114 is using unique seed values. For example, the cooperation module 126b of the centralized computing platform 116 may direct the operations each municipality-based mining device 114a-114n. Alternatively, or in addition, the cooperation module 126a of each municipality-based mining device 114a-114n may communicate with other cooperation modules 126a of other municipality-based mining devices 114a-114n to prevent duplication of work.

In some cases, work duplication is prevented by operating a seed value generation module with its own unique seed value. The seed value generation module may be executed in the centralized computing platform 116 for example as part of the logic of cooperation module 126b. Additionally, or alternatively, the seed generation module may be executed in one or more municipality-based mining devices 114a-114n. In some cases, each municipality-based mining device 114 runs a same or different seed value generation algorithm based on a time clock, a randomly generated number, a precise physical location of the municipality-based mining device 114, or some other means. Once the process begins, the generation of new seed values for each municipality-based mining device 114 operates quickly and uniquely such that no two or more cooperating municipality-based mining devices 114a-114n are duplicating work.

The inventor of the present disclosure has further recognized that municipalities provide system-level resources that are generally unavailable to other mining operations. Each municipality has access to persistent power, and each municipality has the ability to provide or permit state-of-the-art persistent, high-speed communications infrastructure. In this way, any given municipality may be particularly situated to provide distributed ledger computing services with advantages not available to other mining operations. For example, the municipality-based mining devices 114a-114n and/or the centralized computing platform 116 may be physically located closer to the distributed ledger source 118, which reduces communications time of flight. As another example, the municipality-based mining devices 114a-114n may be operated more cost-effectively by the municipality than mining devices of other operators. As yet one more example, two or more municipalities may be arranged to cooperate, share computing devices, or otherwise work together to improve success in mining operations (e.g., a first city works on transactions on behalf of a second city at a first particular time, and the second city works on transactions on behalf of the first city at a second particular time).

Figure 5:
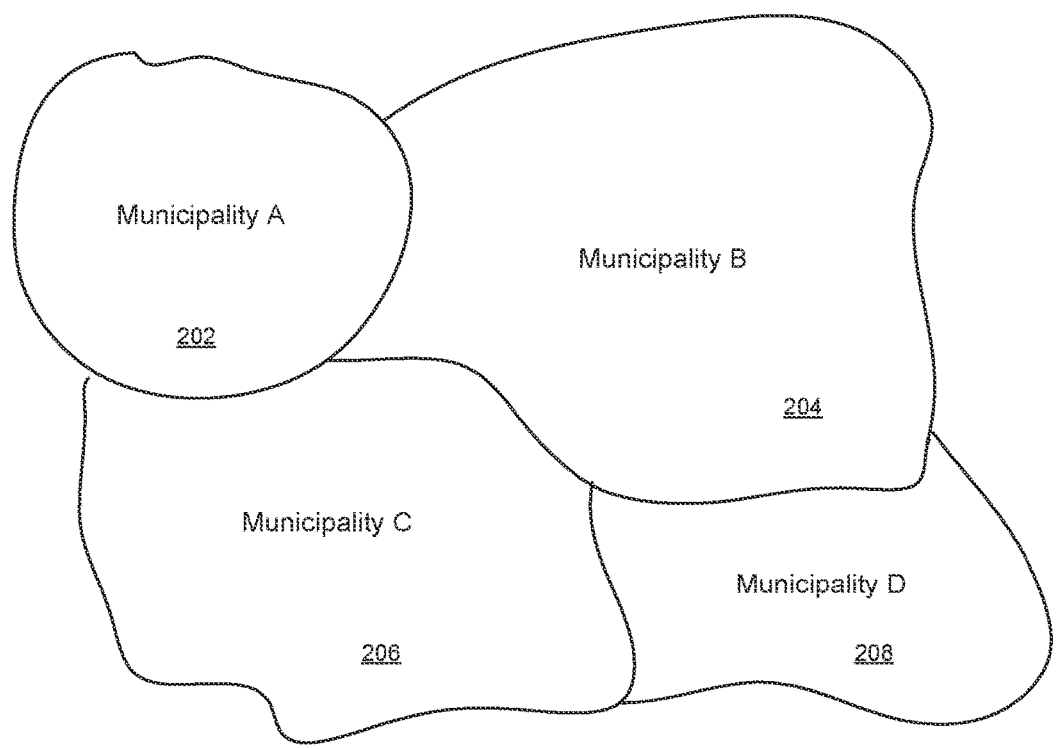
FIG. 5 is a geographic area having a plurality of municipalities.

FIG. 5 is a geographic area 200 having a plurality of municipalities: Municipality A 202, Municipality B 204, Municipality C 206, and Municipality D 208. Any number of municipalities may be represented. The geographic area may represent a country, a state, a city, a town, a township, a village, or any other geographic region of any particular size. Along these lines, each of the plurality of municipalities of FIG. 5 may represent a country, a state, a city, a town, a township, a village, or any other geographic region of any particular size. Cooperation as described in the present disclosure may be between adjacent or non-adjacent municipalities. Cooperation as described herein may be facilitated directly by and between the municipalities. Alternatively, or in addition, cooperation as described herein may be facilitated by a third-party entity.

Figure 6A:
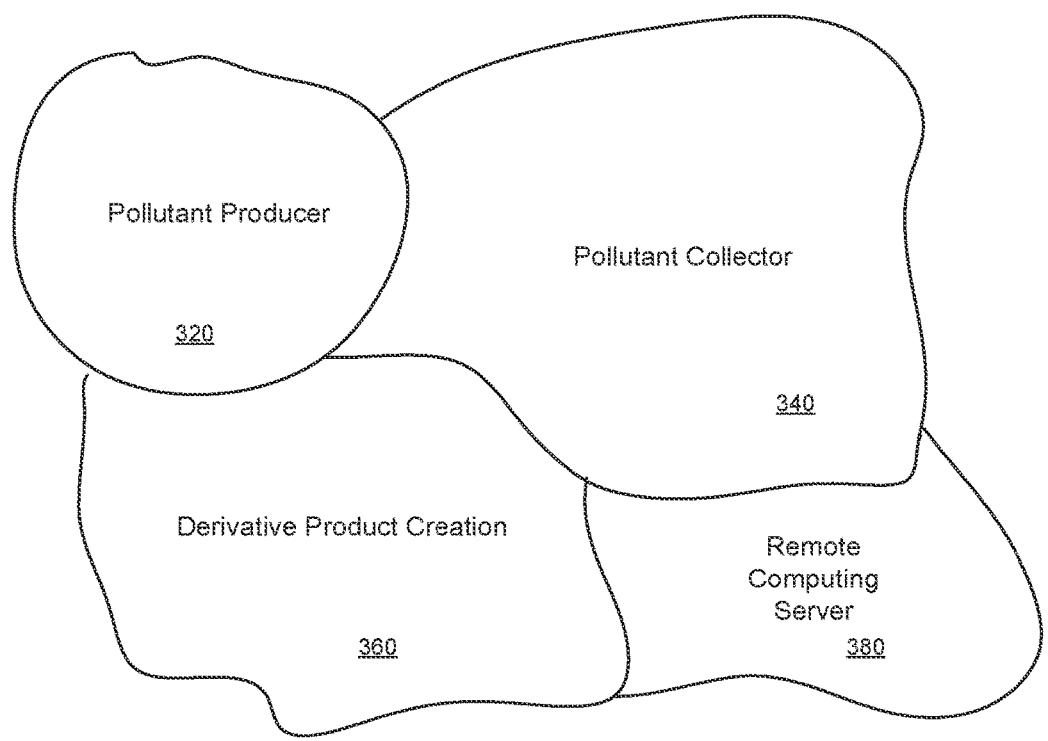
FIG. 6A is a geographic area embodiment of a pollutant-remediation system.

FIG. 6A is a geographic area embodiment of a pollutant-remediation system 300A. A pollutant producer 320 is operating in a first location (e.g., a certain geographic area, a certain building, a certain campus, or the like), a pollutant collector 340 is operating in a second location, a derivative product creation entity 360 is operating in a third location, and a remote computing server 380 is operating in a fourth location. The first, second, third, and fourth locations may be in a same area or different areas. The first, second, third, and fourth locations may individually, collectively, or in groups be located in a same or different yard, lot, building, campus, region, town, city, county, state, country, territory, or any other geographic area. That is, any one or more of the locations may overlap, be adjacent, be nearby, be within inches, feet, yards, acres, miles, or any other suitable distance from each other.

As described in the present disclosure, a pollutant producer 320 may be any device, machine, system, process, factory, or other entity of any size, classification, or composition that is responsible for generating a pollutant and releasing that pollutant into the atmosphere.

A pollutant collector 340 in the present disclosure may be any device, machine, system, process, factory, or other entity of any size, classification, or composition that is responsible for removing a pollutant from the atmosphere.

A derivative product creation entity 360 is arranged to create at least one useful byproduct from a pollutant isolated, concentrated, captured, arranged, or otherwise produced and provided by a pollutant collector 340. A derivative product creation entity 360 is optional. In some cases, the derivative product creation entity 360 operates to produce synthetic diamond material from a carbon-based pollutant provided by a pollutant collector 340. In these or other cases, the optional derivative product creation entity 360 is arranged to create at least one acid or acid-based byproduct, at least one silicon-based byproduct, at least one fluorene-based byproduct, at least one benzene-based product, or at least one other type of byproduct.

A remote computing server 380 is arranged to direct operations or provide other service to a pollutant producer 320, a pollutant collector 340, a derivative product creation entity 360, or some other entity. In some cases, a system of debits and credits is administered, operated, accessed, or otherwise used by a remote computing server 380. In these cases, for example, the remote computing server 380 may accumulate carbon credits or some other record representing a tangible or virtual object of value. Such accumulation may be remuneration for removing or reducing the instance of a certain pollutant from the atmosphere. In addition, the remote computing server 380 may dissipate the carbon credits or other record of value by providing such credits or records to a determined pollutant producer 320. In at least one example, a certain pollutant producer 320 is a concrete or cement plant that produces greenhouse gasses. The concrete or cement plant purchases carbon credits from the pollutant collector 340 via the remote computing server 380. The remote computing server 380 will, in the meantime, generate carbon credits by removing a carbon-based pollutant from the atmosphere.

Figure 6B:
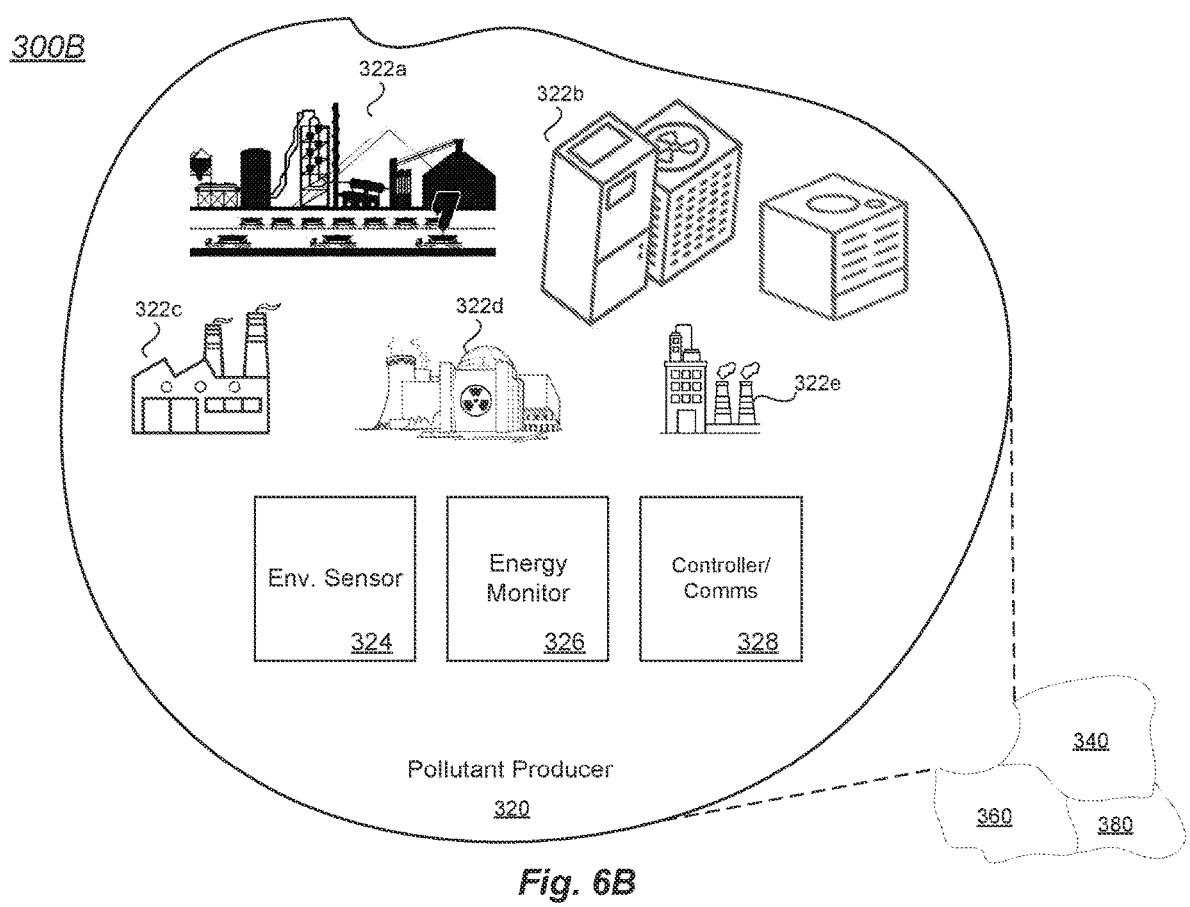
FIG. 6B is a second geographic area embodiment of a pollutant-remediation system illustrating a pollutant producer embodiment in more detail.

FIG. 6B is a second geographic area embodiment of a pollutant-remediation system 300B illustrating a pollutant producer 320 embodiment in more detail. Several polluting systems (i.e., pollutant producing entities) are represented in FIG. 6B, including a roadway materials production facility 322a, heating ventilation air conditioning (HVAC) equipment 322b, a fossil fuel energy production facility 322c, a nuclear energy production facility 322d, and an industrial manufacturing facility 322e. Other pollutant producing entities are of course contemplated.

Proximate the polluting system, the pollutant producer 320 also includes at least one environmental sensor 324 deployed in a first location to collect environmental data of a first type. The polluting system may include any number of other environmental sensors proximate the first environmental sensor 324 or deployed in some other location. In some cases, at least one environmental sensor 324 is deployed close (e.g., inches, feet, yards, or the like) to where the pollutant is released into the atmosphere, and at least one other environmental sensor 324 is deployed remote (e.g., dozens of feet, hundreds of feet, thousands of feet, miles, or the like) from where the pollutant is released into the atmosphere. By deploying two such sensors, it can more accurately be determined how much pollutant the particular polluting system is responsible for.

The environmental sensor 324 may be any suitable environmental sensor. For example, an environmental sensor 324 may be arranged to detect the presence and in some cases the volume of any particular pollutant such as carbon dioxide, carbon dioxide, methane, water vapor or some other greenhouse gas. As an additional or alternative example, an environmental sensor 324 may be arranged to detect the presence or volume of ground-level ozone, nitrous oxide, a chlorofluorocarbon, or another fluorinated gas (i.e., F-gas). Other pollutants that an environmental sensor 324 may measure and/or detect include benzene, lead, carbon monoxide, various nitrogen oxides, various sulfur oxides, total reduced sulfur, volatile organic compounds (VOC), non-naturally occurring particulate matter, and the like. A suitable environmental sensor 324 may be arranged to detect a single pollutant or a plurality of pollutants. A suitable environmental sensor 324 may be arranged to detect a volume of pollutant, a rate of pollutant change, a density of pollutant, or any other useful representation of the subject pollutant.

Also proximate the polluting system, the pollutant producer 320 may also include an optional energy consumption monitoring platform 326. The energy consumption monitoring platform 326 is generally coupled to a power source of the polluting system, and the energy consumption monitoring platform 326 is arranged to measure current, power, or some other property representing the energy consumed by the polluting system. By measuring how much energy is consumed by the polluting system and correlating the energy consumption with pollutant measurement data from the environmental sensor 324, a more accurate understanding of the polluting system's impact on the environment can be determined. In at least one case, this data can be used to determine how many carbon credits the polluting system must purchase in order to keep the entity operating with the law or other regulations of the geographic area.

Figure 7:
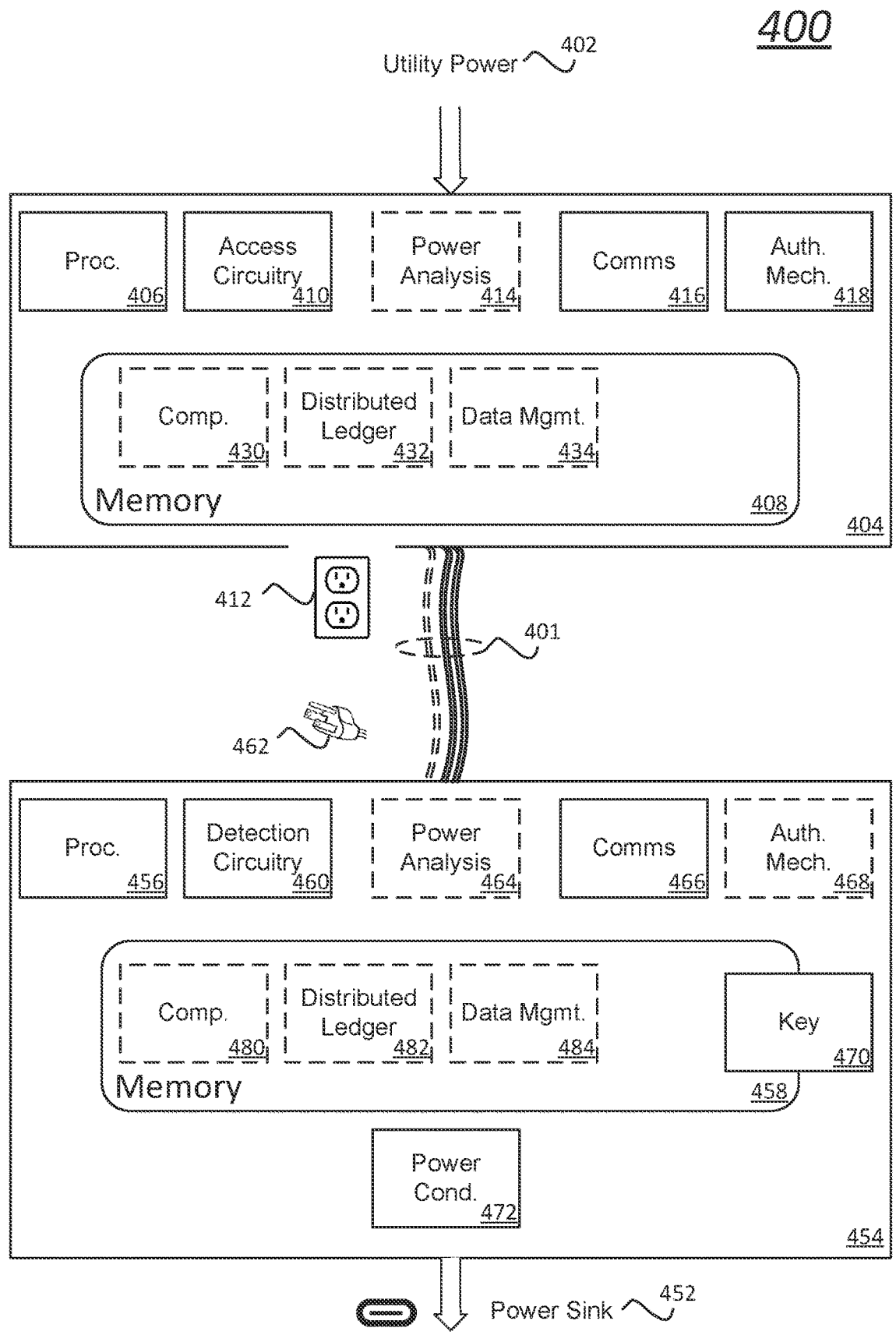
FIG. 7 is a system level deployment of a decentralized power architecture.

In at least one case, the energy consumption monitoring platform 326 is arranged within, proximate to, or in place of a municipality-based mining device 114 (FIGS. 1, 2). In at least one case, the energy consumption monitoring platform 326 is arranged within, proximate to, or in place of a decentralized power architecture 400 (FIG. 7).

A controller 328 is communicatively coupled to any number of environmental sensors 324 and any number of energy consumption monitoring platforms 326. The controller may include a processor, memory, communications circuitry, operational logic, and the like. The memory is arranged to store at least some software instructions executable by the processor. The memory is further arranged to store data. The data may include parameters, calibration data, initialization data, environmental data of any suitable type collected or otherwise produced by any environmental sensor 324 and/or energy consumption data associated with the polluting system and collected or otherwise produced by an energy consumption monitoring platform 326.

In at least some cases, the controller 328 is arranged to direct communication of at least some of the data stored at the pollutant producer 320 to a remote computing server 380.

Figure 6C:
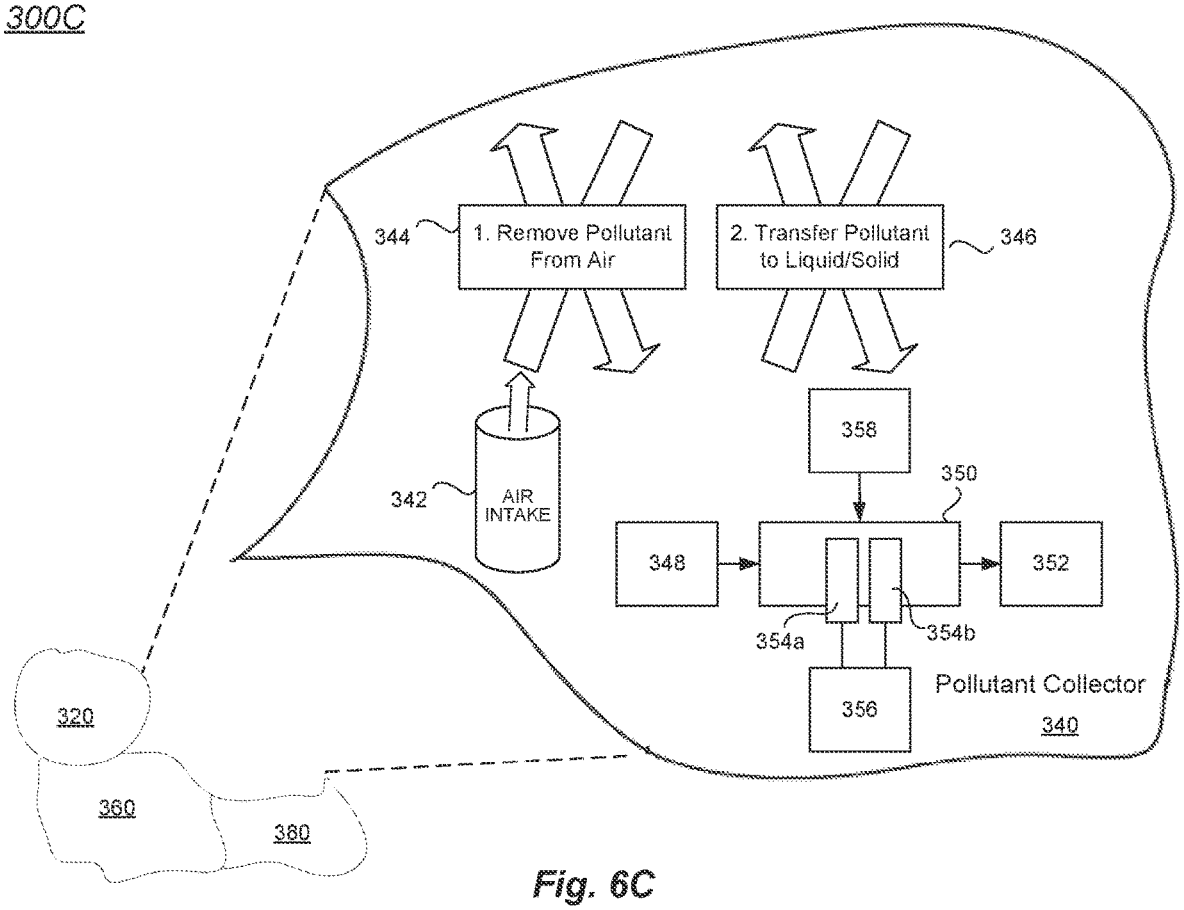
FIG. 6C is a third geographic area embodiment of a pollutant-remediation system illustrating a pollutant collector embodiment in more detail.

FIG. 6C is a third geographic area embodiment of a pollutant-remediation system 300C illustrating a pollutant collector 340 embodiment in more detail. in some cases, the pollutant collector 340 may be referred to as a direct air capture (DAC) system, a pollutant sequestration system, a carbon sequestration system, or some other like term. In one embodiment, the pollutant collector 340 includes any suitable number of air intake conduits 342.

In some cases, an air intake conduit includes one or more pipes, fans, blowers, filters, and other means to urge ambient air into the pollutant collector 340. In a first operation 344, the pollutant (e.g., carbon dioxide, another greenhouse gas, a particulate, or the like) is removed from the air. Such removal may be performed by a membrane, a filter, or a chemical process. In at least one embodiment, an alkaline liquid sorbent such as sodium hydroxide or some other similar medium is used to remove carbon dioxide from the received air stream. The pollutant depleted air is released back to the atmosphere, and the carbonate ions produced by the sodium hydroxide chemical process are passed into a liquid or a solid via a second operation 346. In at least some cases, the second operation may include mixing or reacting the resultant sodium carbonate solution with calcium hydroxide to produce sodium hydroxide and calcium carbonate, which transfers the carbonate anion from the sodium to the calcium cation. The first and second operations 344, 346 may be iterative, performed under certain conditions (e.g., temperature, pressure, volume, state, or the like), and/or performed over one or more particular time parameters.

In at least one case, the first and second operations 344, 346 produce a slurry having a concentrated form of the pollutant. The pollutant may be carbon (e.g., carbon dioxide), and the slurry may be carbon-based material. In such case, the concentrated form of the pollutant is used to produce elongated carbon nanofibers.

In the embodiment of FIG. 6C, a carbon nanofiber producing subsystem includes a carbonate furnace 348, an electrolysis chamber 350, and a collector 352. The carbonate furnace 348, the electrolysis chamber 350, the collector 352, and other components of the subsystem are shown as separate components in FIG. 6C, but any suitable number and arrangement of components may be formed in a same physical structure or in one or more combined structures in other embodiments.

The electrolysis chamber 350 includes a cell or other portion that retains a molten carbonate electrolyte. The molten carbon electrolyte can be produced by heating the carbonate in the furnace 348 and passing the molten substance into the electrolysis chamber 350. An anode 354a and a cathode 354b in the electrolysis chamber 350 are coupled to a power source 356. During a third operation, the concentrated carbon-based slurry from the second operation is injected from a pollutant source 358 into the molten carbonate electrolyte to react with the oxide and renew, rather than consume, the carbonate. In this chamber, via the electrolysis reaction, the pollutant (e.g., carbon dioxide) is converted to oxygen at the anode 354a and carbon nanomaterials at the cathode 354b. The carbon nanomaterials are collected by the collector 352 and stored as a raw material for the production of a derivative product. In at least some cases, the carbon nanomaterials are stored in a canister or some other receptacle.

In some cases, the carbonate furnace 348 heats a carbonate electrolyte such as lithium carbonate to a melting point to produce the molten material. The carbonate furnace 348 and anode 354a/cathode 354b pair may be powered by solar energy, wind energy, wave energy, or some other green power. Alternatively, the carbonate furnace 348 and ode 354a/cathode 354b pair may be powered by a conventional power source. A transition metal catalyst may be added to the electrolysis chamber 350 to speed up or otherwise control the electrochemical process.

Figure 6D:
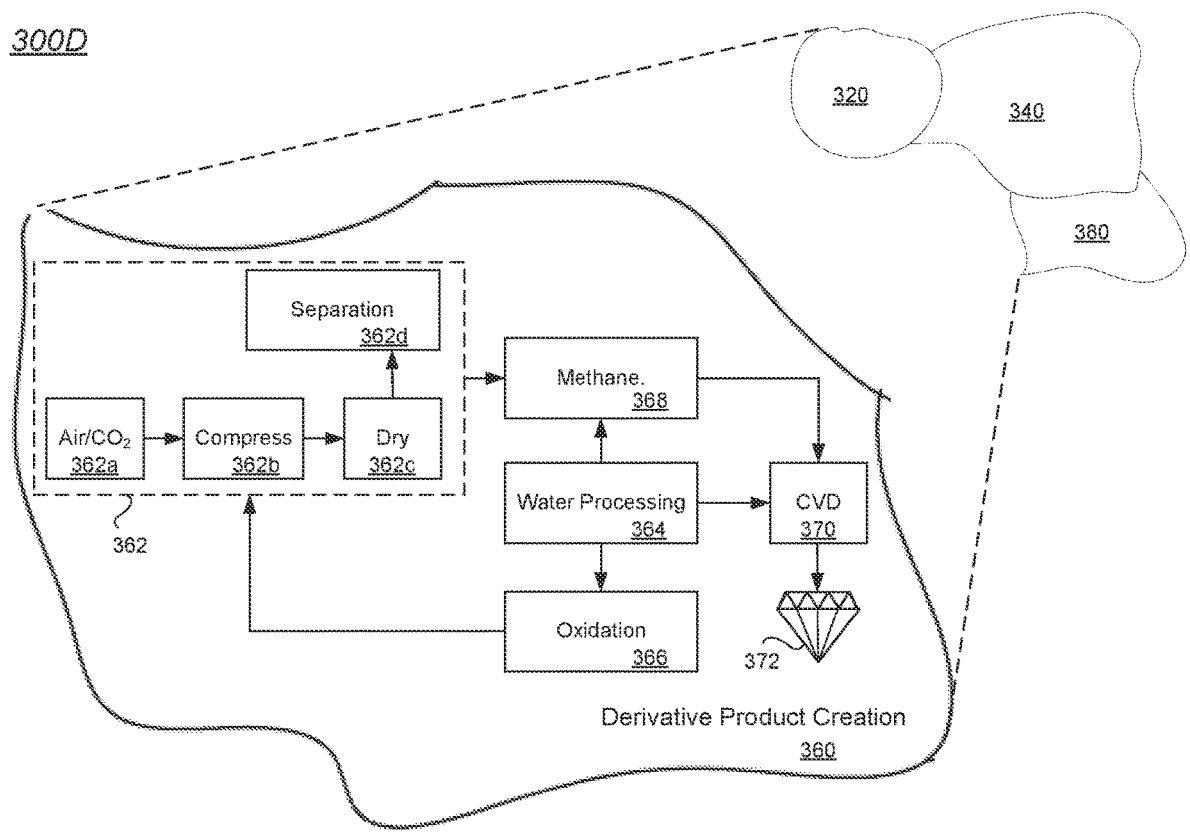
FIG. 6D is a fourth geographic area embodiment of a pollutant-remediation system illustrating a derivative product creation entity embodiment in more detail.

FIG. 6D is a fourth geographic area embodiment of a pollutant-remediation system 300D illustrating a derivative product creation entity 360 embodiment in more detail. In at least one case, the derivative product creation entity 360 is arranged to create synthetic diamond material. The creation of other useful materials from a pollutant are also contemplated. Accordingly, the embodiment of FIG. 6D is not limiting, and instead, one of skill in the art will recognize from the present disclosure how such other useful materials may also be created.

In the derivative product creation entity 360, a pollutant source 362 is embodied as a particular subsystem. In some cases, the pollutant source 362 is simply a cannister or some other receptacle that contains raw material (e.g., liquified carbon dioxide nanofibers) produced by a pollutant collector 340 (FIG. 6C). In other embodiments, the pollutant source 362 is arranged with particular structures to capture a pollutant such as carbon dioxide or some other greenhouse gas from the atmosphere. In these cases, In an embodiment where carbon dioxide or some other greenhouse gas is captured from the atmosphere, the pollutant source 362 includes structures to perform at least four particular operations. In a first capture operation 362a, ambient air containing the pollutant is taken in. In a second capture operation 362b, the in-taken air is compressed, and in a third capture operation 362c, the compressed gas is dried. In a fourth operation 362d, the dried gas containing both air and the subject pollutant (e.g., carbon dioxide) is compressed and expanded to cool, sometimes multiple times, to separate the mixture into ambient air without the pollutant and the pollutant in a liquid state.

At 364, water is put through an electrolysis process to produce hydrogen. In some cases, the water is rainwater, but in other cases, the water comes from a different source. In at least some cases, the water processing at 364 include filtering, distilling, de-ionizing, and put through electrolysis. The electrolysis process produces hydrogen and oxygen. The oxygen is passed into an oxygen purging mechanism at 366, and at least some of the hydrogen is passed into methane processing mechanism at 368 and a chemical vapor deposition (CVD) machine at 370.

At 366, the oxygen is purged from the system. In at least one case, the oxygen passes through the pollutant source mechanism 362 for release back into the atmosphere. In other cases, the oxygen is combined with ambient air or other waste products to produce more carbon dioxide. It is known that oxygen in a chemical vapor deposition process may produce an undesirable soot.

At 368, the pollutant obtained from the pollutant source 362 is reacted with hydrogen produced by the water electrolysis at 364 to produce a hydride. In at least one case, the pollutant is carbon dioxide, which is combined with the hydrogen in a Sabatier reaction to produce methane and water at 368. Other processes (e.g., biological processes) to produce methane are also contemplated.

At 370, a chemical vapor deposition (CVD) process is used to form a synthetic diamond material 372. Producing a synthetic diamond material using CVD generally requires substantially pure carbon dioxide. In one embodiment, the purity produced by either the pollutant source 362 or the pollutant collector is over ninety percent (90%). In other cases, the purity is over ninety-five percent (95%), and some cases, the purity is over ninety-nine percent (99%). In at least one case, the purity of carbon dioxide passed into the CVD process at 370 is 99.9999 percent. In contrast, the concentration of carbon dioxide in the atmosphere is often around 400 parts per million (ppm).

As is known to those of skill in the art, a CVD process to produce synthetic diamond material may be carried out at a pressure of between 0.5 kPa and 100 kPa, particularly at a pressure of about 40 kPa in at least one case.

As is known to those of skill in the art, a CVD process to produce synthetic diamond material may be carried out at a temperature between 600° C. and 1200° C., particularly at a temperature of about 950° C. in at least one case.

As is known to those of skill in the art, a CVD process to produce synthetic diamond material may be carried out on a substrate, particularly a substrate that includes diamond, silicon, tungsten, molybdenum, silicon carbide, silicon nitride, quartz glass or cemented carbide.

Figure 6E:
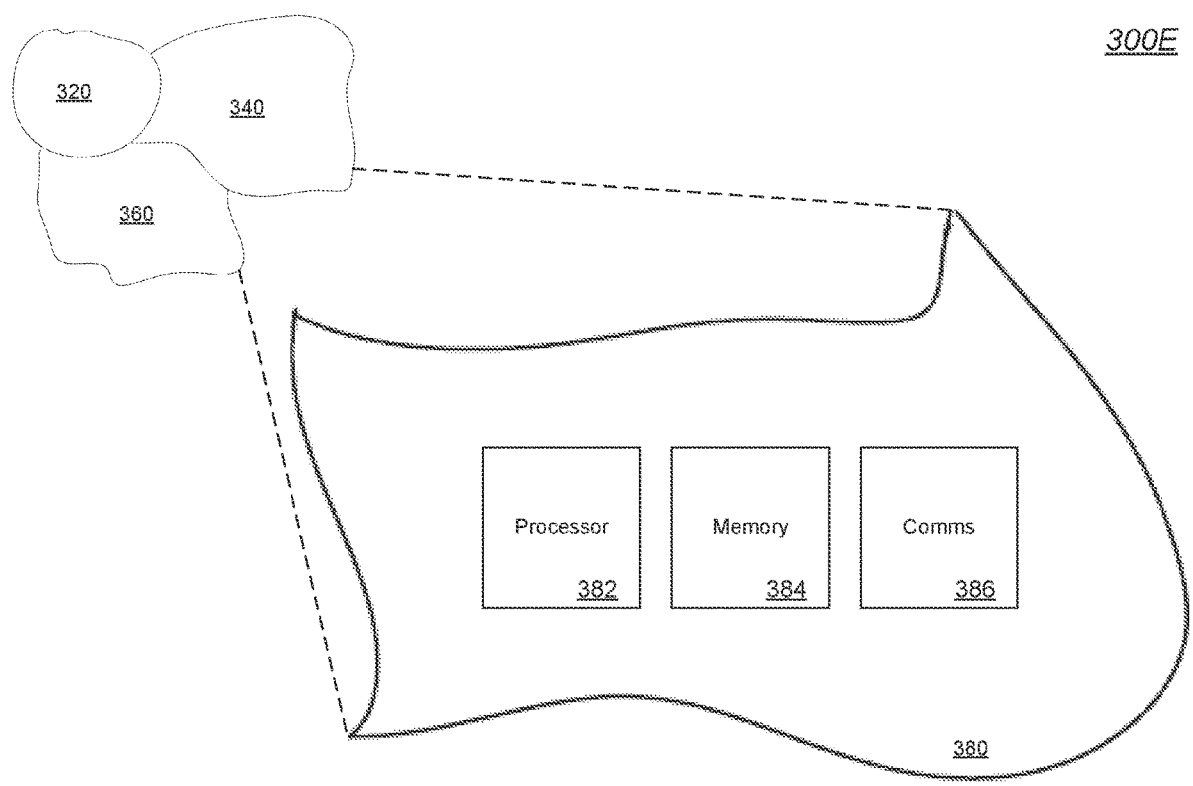
FIG. 6E is a fifth geographic area embodiment of a pollutant-remediation system illustrating a remote computing server embodiment in more detail.

FIG. 6E is a fifth geographic area embodiment of a pollutant-remediation system 300E illustrating a remote computing server 380 embodiment in more detail. The remote computing server 380 includes a processor 382, memory 384, and communications circuitry 386. The remote computing server 380 includes other circuitry and logic that is known by those of skill in the art and not shown to avoid unnecessarily obscuring the novel and non-obvious material presented in detail herein.

The remote computing server 380 in the present disclosure may optionally receive data from any suitable number of pollutant producers 320, pollutant collectors 340, derivative product creation entities 360, and other computing devices. In at least some cases, the remote computing server 380 is arranged to accumulate and dissipate energy credits via any suitable exchange.

Reducing pollutant emissions (e.g., carbon dioxide and other greenhouse gasses) is a generally accepted global initiative and to facilitate such reductions, certain exchanges have been created. A pollutant producer 320 can purchase energy credits to cover the pollutant emissions the producer releases into the atmosphere, and pollutant collector 340 can sell energy credits based on the quantity of pollutants removed from the atmosphere. In some cases, the pollutant producer 320 voluntarily purchases the energy credits, and in other cases a government, regulatory agency, or other authoritarian body mandates the pollutant producer 320 purchase energy credits. In either or both cases, the demand for energy credits creates an incentive for pollutant collectors 340, and an exchange is a computational vehicle for connecting energy credit buyers and energy credit sellers. Hence, in addition to the communicative coupling of the remote computing server 380 to pollutant producers 320, pollutant collectors 340, and derivative product creation entities 360, the remote computing server 380 may be communicatively connected to one or more energy credit exchanges.

In some cases, an energy consumption monitoring platform 326 is arranged in accordance with a decentralized power architecture 400 circuit. The decentralized power architecture 400 circuit optionally enables a decentralization of utility provided power. First electronic circuitry electrically coupled to a power source in a wired or wireless way provides an authorization and access mechanism to the electrical power of the power source. Second electronic circuitry couplable to a power sink in a wired or wireless way provides a key that cooperates with the first electronic circuitry to unlock the delivery of electrical power to a power sink. Such circuitry may also include any suitable number of environmental sensors 324 as described herein.

A power sink is any device, circuit, or other mechanism that is arranged to consume power. The consumption may be a direct consumption such as by a circuit that consumes power. Additionally, or alternatively, the consumption may be indirect consumption such as by a circuit that further passes power to a downstream device or circuit. A non-limiting, non-exhaustive list of power sinks includes consumer electronic devices, industrial equipment, military equipment, tools, lights, batteries, audio equipment, video equipment, telecommunications equipment, and the like. As understood by one of skill in the art, any type of device, circuit, or other mechanism that may be coupled to a power source in a wired or even wireless way may be a power sink. In at least some cases, the pollutant producers 320 described in the present disclosure may be treated as power sink devices.

Utility provided power (e.g., a power interface 110, 110*a*, grid power, power mains, and the like), as the term is used herein, may include any power provided by a utility. The utility may be a power company, a municipality, a consortium, a government, a private entity, a public-private entity, or any other entity. The power may be produced by consumption of fossil fuels, air-powered structures (e.g., wind mills), light powered structures (e.g., solar cells), water powered structures (e.g., wave power, hydro-electric dam, or the like), a chemical reaction, a nuclear reaction, or any other structures or materials capable of producing electricity. In many cases, the electricity provided by a utility power source is sold; in other cases or circumstances, the electricity is provided for other compensation or no compensation at all such as a public service. As the terms are used herein, utility provided power, utility power, utility power source, power provider, and the like may or may not be the entity that generates the power. In at least some cases, the power source is an interim service or entity (e.g., a "middleman") that distributes, manages, or otherwise permits access to electricity in exchange for goods or services.

To avoid unnecessarily obfuscating the teaching of the present disclosure, a system including a first authorization circuit and a second access circuit are now described. The first authorization circuit is electrically coupled in a wired or wireless way to a power source, such as line power in a building (e.g., the electrical infrastructure in the building that supplies power through electrical sockets (e.g., electrical outlets). The second access circuit is added to or integrated with a power cube such as might be used to charge a mobile computing device battery (e.g., a power brick, a wall-wart, a charger, or the like). In at least some cases, the power cube has: a) two or three electrically conductive prongs that are arranged to mate with an electrical socket; b) one or more female ports (e.g., a universal serial bus (USB) port, a power jack such as a 1.7 to 5.5 millimeter power jack, a THUNDERBOLT port, or the like) arranged to provide downstream power through a device power cable; and c) an electrical circuit to condition the utility-side power signal into a suitable device-side power signal (e.g., a circuit to condition an incoming 110 VAC power signal into a 5 VDC power signal). Optionally, one or both of the first and second circuits may include power analysis circuitry. Optionally, one or both circuits may also include environmental sensor circuitry to monitor one or more types of environmental conditions. And at least in some cases, the device-side power signal may be substantially identical to the utility-side power signal.

FIG. 7 is a system level deployment of a decentralized power architecture 400. Utility power 402 is received from a power company, a utility service provider or some other source. The utility power may be AC mains power at 60 VAC, 120 VAC, 230 VAC, 240 VAC, 400 VAC, or some other AC voltage, and the AC mains power may have a frequency of 60 Hertz or 50 Hertz. The utility power 402 of FIG. 7 may be otherwise arranged as a power interface 110, 110*a* (FIGS. 1, 2), grid power, power mains, and the like.

A first authorization circuit 404 is arranged for electrical and communicative coupling to a second access circuit 454. Each of the circuits has a processor 406, 456, respectively and memory 408, 458, respectively. Each processor is coupled to its respective memory and arranged to execute software instructions stored in the memory.

The first authorization circuit 404 includes access circuitry 410, and the second access circuit 454 includes detection circuitry 460. The access circuitry 410 and the detection circuitry 460 may include one or more relays, latches, semiconductor switches, or other components. The access circuitry 410 is arranged to fully or partially couple the utility power to an output 412. The detection circuitry 460 is arranged to detect the presence of a voltage signal at an input 462.

The first authorization circuit 404 optionally includes first power analysis circuitry 414, and the second access circuit 454 optionally includes second power analysis circuitry 464. When so included, the power analysis circuitry 414, 464 may be arranged to analyze power that is passed through its respective circuitry. The analysis may include measurements, calculations, predictions, or the like to generate data associated with the power. Data may include voltage, current, phase, frequency, joules per unit time, noise, changes over time, and any other suitable power signal. In some cases, the power analysis generates, accumulates, or otherwise collects such data over time, and such data may be provided in whole or in part to another entity in exchange for something of value, such as a fee. In at least some cases, one or both power analysis circuits 414, 464 may be arranged to generate energy consumption data as indicated herein in any suitable form and as associated with a pollutant producer 320 (i.e., a polluting system that releases one or more pollutants into the atmosphere).

The access circuitry 410 and the detection circuitry 460 may include one or more relays, latches, semiconductor switches, or other components. The access circuitry 410 is arranged to fully or partially couple the utility power to an output 412. The detection circuitry 460 is arranged to detect the presence of a voltage signal at an input 462.

The first authorization circuit 404 includes first communications circuitry 416, and the second access circuit 454 includes second communications circuitry 466. The first and second communications circuits 416, 466 are arranged for unidirectional or bidirectional communications between them according to any suitable protocol. The communications may be wired or wireless. In at least some cases, the communications between the first authorization circuit 404 and the second access circuit 454 is performed to determine if a certain power sink device 452 is authorized to receive power. In at least some cases, one or both of the first and second communications circuits 416, 466 are arranged to pass at least some energy consumption data to a remote computing server 380. In at least some cases, one or both of the first and second communications circuits 416, 466 are formed as part of controller 328.

In these or other cases, one or both of the first and second communications circuits 416, 466 is arranged for long range communications. Long range communications may be by direct line of sight communication, over the horizon communications, or some other type of communications. The communications may conform to a particular hardware protocol, software protocol, or combined hardware and software protocol. For example, in some cases, one or both of the first and second communications circuits 416, 466 conforms to a long range wireless access network (LoRaWAN) specification. In these or other cases, one or both of the first and second communications circuits 416, 466 conforms to a long-term evolution (LTE) cellular specification, a fifth generation (5G) cellular specification, a sixth generation (6G) cellular specification, or some other suitable protocol.

The first authorization circuit 404 includes a first authorization mechanism 418, and optionally, the second access circuit 454 includes second authorization mechanism 468. Additionally, the second access circuit 454 includes a key mechanism 470. The key mechanism 470 is arranged to cooperate with the first authorization mechanism 418. In some cases, each of the first authorization mechanism 418 and the key mechanism 470 are partially or fully implemented as hardware circuits. In other cases, the first authorization mechanism 418 and the key mechanism 470 are partially or fully implemented in software. In at least one case, the first authorization mechanism 418 and the key mechanism 470 include both hardware and software components. The hardware circuitry may include random number generator circuitry, timer circuitry, micro-electrical mechanical systems (MEMS) circuitry, and the like. The software components may include hash functions, encryption/decryption algorithms, and the like. In at least one case, a software key of the key mechanism 470 is communicated via the first and second communications circuitry 416, 466 from the second access circuit 454 to the first authorization circuit 404 when the input 462 is electromechanically coupled (e.g., plugged in) to the output 412 of the first authorization circuit 404. Upon receiving the software key and validating the key with the first authorization mechanism 418, the access circuitry 410 is triggered to provide certain power 401 at the output 412.

The provision of power at the output 412 may be particularly associated with the key mechanism 470. For example, in some cases, a consumer has paid a particular compensation to receive "full power." In such cases, the consumer may more quickly charge their power sink device 452 (e.g., smartphone, laptop, or the like). The particular compensation provided, as discussed in the present disclosure may include monetary compensation, data, digital currency, a promise, a service, or any other suitable remuneration.

In at least some cases, one or more of the circuits described herein are cascaded. Considering one case, for example, the first authorization circuit 404 and the second access circuit 454 cooperate such that power is delivered from the utility power source 402 to the second access circuit 454, which is configured as a power cube. Subsequently, the second access circuit 454 and a downstream power sink device 452, which is configured as a mobile computing device cooperate to deliver power from the power cube to the mobile computing device. At this second level of the cascade, the mobile computing device includes its own key mechanism (not shown) that cooperates with the optional authorization mechanism 468 of the second access circuit 454.

The second access circuit 454 includes power conditioning circuitry 472. The power conditioning circuitry 472 may be arranged to change the input power signal to a suitable output power signal. In some cases, such changing may include rectification from an alternating current (AC) signal to a direct current (DC) signal, changing voltage, regulating the amount of current that the power sink device 452 may draw, and the like. In at least some cases, a timer associated with the power conditioning circuitry 472 controls a duration of power availability at the output of the second access circuit 454. In still other cases, the output power signal is the same or substantially the same as the input power signal.

Optionally, the respective memories 408, 458 of the first authorization circuit 404 and second access circuit 454 include functional software arranged to decentralize power from a traditional metered function at an entity level (e.g., a power meter in an apartment, a power meter for an entire building, a power meter for a region, and the like) to an individual entity.

The memory 408 of the first authorization circuit 404 may optionally store zero or more of a compensation module 430, a distributed ledger module 432, a data management module 434, and any other suitable software.

The memory 458 of the second access circuit 454 may optionally store zero or more of a compensation module 480, a distributed ledger module 482, a data management module 484, and any other suitable software.

Figure 8:
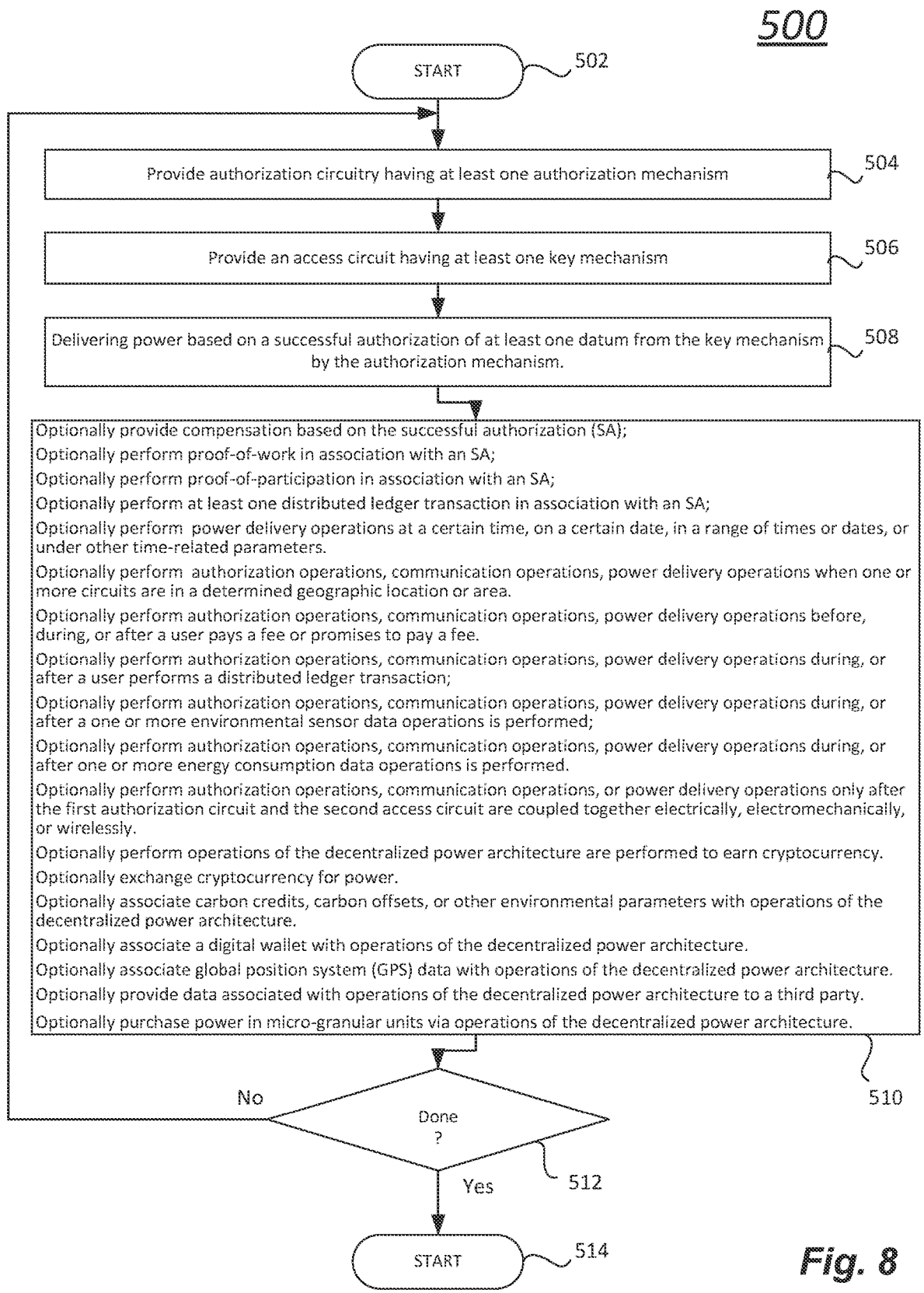
FIG. 8 is a data flow diagram of a decentralized power architecture method.

FIG. 8 is a data flow diagram of a decentralized power architecture method 500. Processing begins at 502.

At 504, an authorization circuit is provided. The authorization circuit has at least one authorization mechanism. Processing advances to 506.

At 506, an access circuit is provided. The access circuit has at least one key mechanism. Processing advances to 508.

At 508, based on a successful authorization of at least one datum from the key mechanism by the authorization mechanism, power is delivered. Processing advances to 510.

Optional processing at 510 may occur before power is delivered, after power is delivered, and while power is being delivered.

Optional processing may include optionally providing compensation based on a successful authorization; optionally performing proof-of-work in association with a successful authorization; optionally performing proof-of-participation in association with a successful authorization; and optionally performing at least one distributed ledger transaction in association with a successful authorization. Other optional processing may be performed.

In some cases, authorization operations, communication operations, power delivery operations, and/or other operations are only performed at a certain time, on a certain date, in a range of times or dates, or under other time-related parameters.

In some cases, authorization operations, communication operations, power delivery operations, and/or other operations are only performed when one or more circuits is in a determined geographic location or area. In such cases, location information may or may not be recorded.

In some cases, authorization operations, communication operations, power delivery operations, and/or other operations are only performed before, during, or after a user pays a fee or promises to pay a fee.

In some cases, authorization operations, communication operations, power delivery operations, and/or other operations are only performed before, during, or after a user performs a distributed ledger transaction;

In some cases, authorization operations, communication operations, power delivery operations, and/or other operations are only performed before, during, or after one or more environmental sensor data operations is performed.

In some cases, authorization operations, communication operations, power delivery operations, and/or other operations are only performed before, during, or after one or more energy consumption data operations is performed.

In some cases, authorization operations, communication operations, power delivery operations, and/or other operations are only performed after the first authorization circuit and the second access circuit are coupled together electrically, electromechanically, or wirelessly.

In some cases, operations of the decentralized power architecture are performed to earn cryptocurrency.

In some cases, cryptocurrency is exchanged for power.

In some cases, carbon credits, carbon offsets, or other environmental parameters are associated with operations of the decentralized power architecture (DPA) 400.

In some cases, a digital wallet is associated with operations of the decentralized power architecture (DPA) 400.

In some cases, global position system (GPS) data is associated with operations of the decentralized power architecture (DPA) 400.

In some cases, a third party is a recipient of data associated with operations of the decentralized power architecture (DPA) 400. Sometimes the third party exchanges digital currency for such data.

In some cases, a utility such as a power company is arranged to sell power in micro-granular units via operations of the decentralized power architecture (DPA) 400.

Processing advances to 512.

At 512, if operations of the system are complete, processing ends at 514. Conversely, if operations of the system are to continue, processing returns to 504.

Having now set forth certain embodiments, further clarification of certain terms used herein may be helpful to providing a more complete understanding of that which is considered inventive in the present disclosure.

In the embodiments of present disclosure, one or more particular acts and structures related to distributed ledger operations are described. The various components and devices of the embodiments are interchangeably described herein as "coupled," "connected," "attached," and the like. It is recognized that once assembled, the individual components may be directly joined or indirectly joined through any suitable intervening structures.

In some cases, data flow diagrams may be used in the present disclosure or related disclosures that illustrate one or more non-limiting processes used by embodiments of distributed ledger operations. In this regard, each described process may represent a module, segment, or portion of software code, which comprises one or more executable instructions for implementing the specified logical function (s). It should also be noted that in some implementations, the functions noted in the process may occur in a different order, may include additional functions, may occur concurrently, and/or may be omitted.

The figures in the present disclosure illustrate portions of one or more non-limiting computing device embodiments such as one or more components of the municipality-based mining devices 114a-114n and the centralized computing platform 116. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processing devices, or "processors," as described herein, include central processing units (CPU's), microcontrollers (MCU), digital signal processors (DSP), application specific integrated circuits (ASIC), peripheral interface controllers (PIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. Processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

The present application discusses several embodiments that include or otherwise cooperate with one or more computing devices. It is recognized that these computing devices are arranged to perform one or more algorithms to implement various concepts taught herein. Each of said algorithms is understood to be a finite sequence of steps for solving a logical or mathematical problem or performing a task. Any or all of the algorithms taught in the present disclosure may be demonstrated by formulas, flow charts, data flow diagrams, narratives in the specification, and other such means as evident in the present disclosure. Along these lines, the structures to carry out the algorithms disclosed herein include at least one processing device executing at least one software instruction retrieved from at least one memory device. The structures may, as the case may be, further include suitable input circuits known to one of skill in the art (e.g., keyboards, buttons, memory devices, communication circuits, touch screen inputs, and any other integrated and peripheral circuit inputs (e.g., accelerometers, thermometers, light detection circuits and other such sensors)), suitable output circuits known to one of skill in the art (e.g., displays, light sources, audio devices, tactile devices, control signals, switches, relays, and the like), and any additional circuits or other structures taught in the present disclosure. To this end, every invocation of means or step plus function elements in any of the claims, if so desired, will be expressly recited.

As known by one skilled in the art, a computing device has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor. Some or all of the stored contents of a memory may include software instructions executable by a processing device to carry out one or more particular acts.

The computing devices illustrated herein may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity.

Amongst other things, the exemplary computing devices of the present disclosure (e.g., municipality-based mining devices 114a-114n and the centralized computing platform 116) may be configured in any type of mobile or stationary computing device such as a remote cloud computer, a computing server, a smartphone, a tablet, a laptop computer, a wearable device (e.g., eyeglasses, jacket, shirt, pants, socks, shoes, other clothing, hat, helmet, other headwear, wristwatch, bracelet, pendant, other jewelry), vehicle-mounted device (e.g., train, plane, helicopter, unmanned aerial vehicle, unmanned underwater vehicle, unmanned land-based vehicle, automobile, motorcycle, bicycle, scooter, hover-board, other personal or commercial transportation device), industrial device (e.g., factory robotic device, home-use robotic device, retail robotic device, office-environment robotic device), or the like. Accordingly, the computing devices include other components and circuitry that is not illustrated, such as, for example, a display, a network interface, memory, one or more central processors, camera interfaces, audio interfaces, and other input/output interfaces. In some cases, the exemplary computing devices may also be configured in a different type of low-power device such as a mounted video camera, an Internet-of-Things (IoT) device, a multimedia device, a motion detection device, an intruder detection device, a security device, a crowd monitoring device, or some other device.

When so arranged as described herein, each computing device may be transformed from a generic and unspecific computing device to a combination device arranged comprising hardware and software configured for a specific and particular purpose such as to provide a determined technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The embodiments described herein use computerized technology to improve the technology of distributed ledger operations, but there other techniques and tools remain available to distributed ledger operations. Therefore, the claimed subject matter does not foreclose the whole or even substantial distributed ledger technological area. The innovation described herein uses both new and known building blocks combined in new and useful ways along with other structures and limitations to create something more than has heretofore been conventionally known. The embodiments improve on computing systems which, when un-programmed or differently programmed, cannot perform or provide the specific distributed ledger system features claimed herein. The embodiments described in the present disclosure improve upon known distributed ledger processes and techniques. The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately. There is no prevailing, accepted definition for what constitutes an abstract idea. To the extent the concepts discussed in the present disclosure may be considered abstract, the claims present significantly more tangible, practical, and concrete applications of said allegedly abstract concepts. And said claims also improve previously known computer-based systems that perform distributed ledger operations.

Software may include a fully executable software program, a simple configuration data file, a link to additional directions, or any combination of known software types. When a computing device updates software, the update may be small or large. For example, in some cases, a computing device downloads a small configuration data file to as part of software, and in other cases, a computing device completely replaces most or all of the present software on itself or another computing device with a fresh version. In some cases, software, data, or software and data is encrypted, encoded, and/or otherwise compressed for reasons that include security, privacy, data transfer speed, data cost, or the like.

Database structures, if any are present in the distributed ledger systems described herein, may be formed in a single database or multiple databases. In some cases, hardware or software storage repositories are shared amongst various functions of the particular system or systems to which they are associated. A database may be formed as part of a local system or local area network. Alternatively, or in addition, a database may be formed remotely, such as within a distributed "cloud" computing system, which would be accessible via a wide area network or some other network.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like.

In at least one embodiment, devices such as the municipality-based mining devices 114a-114n and the centralized computing platform 116 may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, Wi-Fi, Worldwide Interoperability for Microwave Access (WiMax), or the like.

In the present disclosure, memory may be used in one configuration or another. The memory may be configured to store data. In the alternative or in addition, the memory may be a non-transitory computer readable medium (CRM). The CRM is configured to store computing instructions executable by a processor of the municipality-based mining devices 114a-114n and the centralized computing platform 116. The computing instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of a distributed ledger operations system.

Buttons, keypads, computer mice, memory cards, serial ports, bio-sensor readers, touch screens, and the like may individually or in cooperation be useful to a user operating the distributed ledger system. The devices may, for example, input control information into the system. Displays, printers, memory cards, LED indicators, temperature sensors, audio devices (e.g., speakers, piezo device, etc.), vibrators, and the like are all useful to present output information to the user operating the distributed ledger system. In some cases, the input and output devices are directly coupled to the municipality-based mining devices 114a-114n and the centralized computing platform 116 and electronically coupled to a processor or other operative circuitry. In other cases, the input and output devices pass information via one or more communication ports (e.g., RS-232, RS-485, infrared, USB, etc.).

As described herein, for simplicity, a user may in some cases be described in the context of the male gender. It is understood that a user can be of any gender, and the terms "he," "his," and the like as used herein are to be interpreted broadly inclusive of all known gender definitions. As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of nanoseconds, microseconds, or milliseconds), and that the activity may be performed on an ongoing basis. An example of an activity that is not real-time is one that occurs over an extended period of time (e.g., hours or days) or that occurs based on intervention or direction by a user or other activity.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a municipality-based mining device 114 or centralized computing platform 116 may be described as being formed or otherwise oriented "substantially vertical," In these cases, a device that is oriented exactly vertical is oriented along a "Z" axis that is normal (i.e., 90 degrees or at right angle) to a plane formed by an "X" axis and a "Y" axis. Different from the exact precision of the term, "vertical," the use of "substantially" to modify the characteristic permits a variance of the "vertical" characteristic by up to 30 percent. Accordingly, a device that is oriented "substantially vertical" includes municipality-based mining devices 114a-114n and the centralized computing platform 116 oriented between 63 degrees and 117 degrees. A device that is oriented at 45 degrees of an X-Y plane, however, is not mounted "substantially vertical." As another example, a municipality-based mining device 114 or centralized computing platform 116 having a particular linear dimension of "between about three (3) inches and five (5) inches" includes such devices in which the linear dimension varies by up to 30 percent, Accordingly, the particular linear dimension of the device may be between one point five (1.5) inches and six point five (6.5) inches.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being"on," "coupled to," or "connected to" another element, the elements can be directly on, directly coupled to, or directly connected to each other, or intervening elements may be present. In contrast, when an element is referred to as being"directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not interpret the scope or meaning of the embodiments.

The various embodiments described above can be combined to provide further embodiments. Various features of the embodiments are optional, and, features of one embodiment may be suitably combined with other embodiments. Aspects of the embodiments can be modified, if necessary to employ concepts of the various patents, application and publications to provide yet further embodiments.

In the description herein, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to avoid obscuring the description with unnecessary detail. Thus, the present disclosure is not intended to be limited to the embodiments shown but is instead to be accorded the widest scope consistent with the principles and features disclosed herein. Hence, these and other changes can be made to the embodiments in light of the above-detailed description. In general, in the following claims, the terms used should not be construed to limit the claims to the specific embodiments disclosed in the specification but should be construed to include all possible embodiments along with the full scope of equivalents to which such claims are entitled. Accordingly, the claims are not limited by the disclosure.

The various embodiments described above can be combined to provide further embodiments. Aspects of the embodiments can be modified, if necessary to employ concepts of the various patents, application and publications to provide yet further embodiments.

In the description herein, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to avoid obscuring the description with unnecessary detail. Thus, the present disclosure is not intended to be limited to the embodiments shown but is instead to be accorded the widest scope consistent with the principles and features disclosed herein. Hence, these and other changes can be made to the embodiments in light of the above-detailed description. In general, in the following claims, the terms used should not be construed to limit the claims to the specific embodiments disclosed in the specification but should be construed to include all possible embodiments along with the full scope of equivalents to which such claims are entitled. Accordingly, the claims are not limited by the disclosure.

The invention claimed is:

1. A system, comprising:
a remote computing system associated with a plurality of sensors, an energy consumption monitoring platform, a plurality of communications subsystems, a plurality of direct air capture subsystems, and at least one derivative product creation (DPC) system, the remote computing system arranged to provide pollution remediation by directly managing energy-related operations of the system, such energy management operations including determining baseline energy consumption data of a polluting system, determining baseline greenhouse gas data proximate the polluting system, and correlating energy consumption data with greenhouse gas data;
wherein at least one sensor of the plurality of sensors is deployed at a first location proximate the polluting system, the at least one sensor arranged to collect environmental data of a first type, the first type being a greenhouse gas;
wherein the energy consumption monitoring platform is deployed at the first location, and the energy consumption monitoring platform is arranged to generate energy consumption data associated with the polluting system;
a controller communicatively coupled to the sensor and the energy consumption monitoring platform, the controller arranged to direct communication of at least some of the environmental data and at least some of the energy consumption data to the remote computing system;
a direct air capture (DAC) system deployed at a second location, the DAC system arranged to remove a selected pollutant from ambient air and isolate a concentrated form of said selected pollutant as a raw material; and
a derivative product creation (DPC) system deployed at a third location, the DPC system arranged to produce a derivative product by processing the raw material;
wherein the remote computing system deployed at a fourth location, and
wherein the remote computing system is arranged to:
accumulate pollutant credits based on removal of the selected pollutant by the DAC system; and
dissipate at least some of the accumulated pollutant credits based on at least some of the energy consumption data.

2. The system of claim 1 wherein the polluting system is an energy production facility, a roadway materials production facility, an industrial manufacturing facility, or at least one piece of heating, ventilation, or air conditioning (HVAC) equipment.

3. The system of claim 1 wherein at least two of the first location, the second location, the third location, and the fourth location are in about the same geographic area.

4. The system of claim 1 wherein the sensor is arranged to collect environmental data representing a quantity of at least one of: carbon dioxide, sodium dioxide, nitrous oxide, benzene, methane, a chlorofluorocarbon.

5. The system of claim 1 wherein the selected pollutant is a gas that absorbs and emits radiant energy within the thermal infrared range.

6. The system of claim 1 wherein the energy consumption data is at least one of current and power.

7. The system of claim 1 wherein the raw material is a liquified carbon dioxide solution.

8. The system of claim 1 wherein the derivative product is a synthetic diamond material.

9. The system of claim 1
wherein the plurality of sensors are deployed at a respective plurality of disparate locations, each of the plurality of sensors deployed proximate a respective polluting system, each of the plurality of sensors arranged to collect environmental data of the first type.

10. The system of claim 1, further comprising:
a second sensor deployed at a fifth location proximate a second polluting system, the second sensor arranged to collect environmental data of a second type, the second type being different from the first type.

11. The system of claim 1, further comprising:
a centralized computing platform arranged to validate blockchain or blockchain-like transactions; and
a plurality of municipality-based mining devices physically located on, within, or proximate to infrastructure of a certain municipality, each of the plurality of municipality-based mining devices arranged to receive utility grid power on behalf of the certain municipality and further arranged for high-speed communications to the remote computing system, wherein each of the plurality of municipality-based mining devices is formed in a respective energy consumption monitoring platform that includes cooperation logic arranged to prevent duplication of work of others of the plurality of municipality-based mining devices, wherein the remote computing system is further arranged to:
communicate with a distributed ledger source;
validate distributed ledger transactions in exchange for remuneration; and
wherein the centralized computing platform is further arranged to direct at least some of the plurality of municipality-based mining devices to cooperatively work together towards a common solution.

12. The system of claim 11 wherein the remote computing system includes second cooperation logic arranged to direct the cooperation logic of each of the plurality of municipality-based mining devices.

13. A method, comprising:
deploying a sensor at a first location proximate a polluting system;
collecting, with the sensor, environmental data of a first type;
deploying an energy consumption monitoring platform at the first location;
centrally managing a plurality of sensors and an energy consumption monitoring platform, wherein said central management includes determining baseline energy consumption data of a polluting system, determining baseline greenhouse gas data proximate the polluting system, and correlating energy consumption data with greenhouse gas data;
generating, with the energy consumption monitoring platform, energy consumption data associated with the polluting system;
directing, with a controller that is communicatively coupled to the sensor and the energy consumption monitoring platform, communication of at least some of the environmental data and at least some of the energy consumption data to a remote computing system;
deploying a direct air capture (DAC) system at a second location;
removing, with the DAC system, a selected pollutant from ambient air;
isolating, with the DAC system, a concentrated form of said selected pollutant as a raw material;
deploying a derivative product creation (DPC) system at a third location; and
processing the raw material with the DPC system into a derivative product.

14. The method of claim 13, comprising:
deploying the remote computing system at a fourth location;
accumulating, with the remote computing system, pollutant credits based on removal of the selected pollutant by the DAC system; and
dissipating, with the remote computing system, at least some of the accumulated pollutant credits based on at least some of the energy consumption data.

15. The method of claim 13 wherein the selected pollutant is carbon dioxide.

16. The method of claim 15 wherein the derivative product is a synthetic diamond material.

17. A non-transitory computer-readable storage medium whose stored contents configure a computing system to perform a method, the method comprising:
centrally managing a plurality of sensors and an energy consumption monitoring platform, wherein said central management includes determining baseline energy consumption data of a polluting system, determining baseline greenhouse gas data proximate the polluting system, and correlating energy consumption data with greenhouse gas data;
accumulating, with the computing system, pollutant credits based on removal of a selected pollutant by a direct air capture (DAC) system; and
dissipating, with the computing system, at least some of the accumulated pollutant credits based on at least some of energy consumption data associated with a pollutant producer;
wherein the dissipating is based on environmental data generated by a sensor deployed at a first location and energy consumption data is generated by an energy consumption monitoring platform deployed at the first location, and wherein the accumulating is based on removing, with a direct air capture (DAC) system deployed at a second location, at least some of the selected pollutant from ambient air.

18. The non-transitory computer-readable storage medium according to claim 17 whose stored contents configure the computing system to perform the method, wherein the DAC system is arranged to produce a concentrated form of said selected pollutant as a raw material, and wherein the raw material is arranged to be processed into a derivative product with a derivative product creation (DPC) system deployed at a third location.

19. The non-transitory computer-readable storage medium according to claim 17 wherein at least two of the first location, the second location, and the third location are in about the same geographic area.

20. The non-transitory computer-readable storage medium according to claim 17 wherein the derivative product is a synthetic diamond material.

* * * * *